US012515183B2

(12) United States Patent
Glover et al.

(10) Patent No.: US 12,515,183 B2
(45) Date of Patent: Jan. 6, 2026

(54) PROCESS VESSEL ENTRY ZONES

(71) Applicant: Crystaphase Products, Inc., Houston, TX (US)

(72) Inventors: Bradley Glover, Houston, TX (US); Austin Schneider, Humble, TX (US); John N. Glover, Houston, TX (US); Peter Gregory Ham, Houston, TX (US)

(73) Assignee: Crystaphase Products, Inc., Houston, TX (US)

( * ) Notice: Subject to any disclaimer, the term of this patent is extended or adjusted under 35 U.S.C. 154(b) by 0 days.

(21) Appl. No.: 18/242,811

(22) Filed: Sep. 6, 2023

(65) Prior Publication Data

US 2024/0066484 A1    Feb. 29, 2024

Related U.S. Application Data

(63) Continuation of application No. 17/470,913, filed on Sep. 9, 2021, now Pat. No. 11,752,477.

(60) Provisional application No. 63/076,226, filed on Sep. 9, 2020.

(51) Int. Cl.
*B01D 15/34* (2006.01)
*B01D 24/02* (2006.01)
*B01J 4/00* (2006.01)
*B01J 20/02* (2006.01)
*C10G 67/02* (2006.01)

(52) U.S. Cl.
CPC .............. *B01J 4/001* (2013.01); *B01J 20/02* (2013.01); *C10G 67/02* (2013.01)

(58) Field of Classification Search
CPC .................................. B01D 15/34; B01D 24/02
See application file for complete search history.

(56) References Cited

U.S. PATENT DOCUMENTS

| 436,414 A | 9/1890 | Graham |
| 578,548 A | 3/1897 | Deruelle |
| 598,351 A | 2/1898 | Staub |
| 1,947,777 A | 2/1934 | Huff et al. |
| 2,000,078 A | 5/1935 | Haseltine |
| 2,006,078 A | 6/1935 | Pyzel |
| 2,055,162 A | 9/1936 | Friedrich |
| 2,153,599 A | 4/1939 | Thomas |
| 2,183,657 A | 12/1939 | Page |
| 2,198,861 A | 4/1940 | Chamberlain |
| 2,212,932 A | 8/1940 | Fairlie |
| 2,375,336 A | 5/1945 | Weitkamp |
| 2,408,164 A | 9/1946 | Foster |
| 2,439,021 A | 4/1948 | Quigg |
| 2,546,479 A | 3/1951 | Sodano |
| 2,571,958 A | 10/1951 | Slaughter et al. |
| 2,739,118 A | 3/1956 | Comte |
| 2,793,017 A | 5/1957 | Lake |
| 2,819,887 A | 1/1958 | Eversole et al. |
| 2,867,425 A | 1/1959 | Teller |
| 2,893,852 A | 7/1959 | Montgomery |
| 2,919,981 A | 1/1960 | Calva |
| 2,985,589 A | 5/1961 | Broughton et al. |
| 3,090,094 A | 5/1963 | Schwartzwalder et al. |
| 3,100,688 A | 8/1963 | Dess |
| 3,151,187 A | 9/1964 | Comte |
| 3,167,600 A | 1/1965 | Worman |
| 3,169,839 A | 2/1965 | Calva |
| 3,171,820 A | 3/1965 | Volz |
| 3,175,918 A | 3/1965 | McGahan |
| 3,208,833 A | 9/1965 | Carson |
| 3,214,247 A | 10/1965 | Broughton |
| 3,219,194 A | 11/1965 | Scwartzwalder |
| 3,232,589 A | 2/1966 | Eckert |
| 3,266,787 A | 8/1966 | Eckert |
| 3,329,271 A | 7/1967 | Ward |
| 3,361,839 A | 1/1968 | Lester |
| 3,410,057 A | 11/1968 | Lerner |
| 3,423,185 A | 1/1969 | Ballard et al. |
| 3,431,082 A | 3/1969 | Sellin |
| 3,487,112 A | 12/1969 | Paulik et al. |
| 3,489,529 A | 1/1970 | Dudych et al. |
| 3,498,755 A | 3/1970 | Borre |
| 3,506,248 A | 4/1970 | Starbuck et al. |
| 3,543,937 A | 12/1970 | Choun |
| 3,544,457 A | 12/1970 | Fredrick et al. |
| 3,562,800 A | 2/1971 | Carlson |
| 3,563,887 A | 2/1971 | Sommers et al. |
| 3,618,910 A | 11/1971 | Arndt |

(Continued)

FOREIGN PATENT DOCUMENTS

| AU | 2010203014 | 8/2010 |
| CA | 2019928 | 12/1991 |

(Continued)

OTHER PUBLICATIONS

Japanese Patent Office; Notice of Reasons for Rejection, issued in connection to JP2018-541647; Aug. 28, 2019; 14 pages; Japan.
Korean Intellectual Property Office; Notification of Provisional Rejection, issued in connection to application No. 10-2018-7021988; Oct. 22, 2019; 7 pages; Korea.
European Patent Office; Communication Pursuant to Article 94(3) EPC, issued in connection to EP17706648.7; Oct. 24, 2019; 7 pages; Europe.
Korean Intellectual Property Office; Notification of Provisional Rejection, issued in connection to application No. 10-2018-7026274; Oct. 22, 2019; 14 pages; Korea.

(Continued)

*Primary Examiner* — Randy Boyer
(74) *Attorney, Agent, or Firm* — Greenberg Traurig LLP

(57) ABSTRACT

Process vessels can contain one or more entry zones containing stability-improving materials. The entry zones address bed movement and filtration problems. The stability-improving material can be positioned above a treating zone or above a processing bed within the vessel. Entry Zones are intended to improve the stability of downstream operations.

27 Claims, 13 Drawing Sheets

(56) References Cited

U.S. PATENT DOCUMENTS

| | | | |
|---|---|---|---|
| 3,635,943 | A | 1/1972 | Stewart |
| 3,657,864 | A | 4/1972 | Davis, Jr. et al. |
| 3,685,971 | A | 8/1972 | Carson |
| 3,706,812 | A | 12/1972 | Derosset et al. |
| 3,717,670 | A | 2/1973 | Schultz |
| 3,732,078 | A | 5/1973 | Kassarjian |
| 3,752,453 | A | 8/1973 | Doyne |
| 3,758,087 | A | 9/1973 | Hoon, Jr. |
| 3,787,188 | A | 1/1974 | Lyon |
| 3,787,189 | A | 1/1974 | Lovell et al. |
| 3,789,989 | A | 2/1974 | Carson |
| 3,796,657 | A | 3/1974 | Protorius et al. |
| D232,236 | S | 7/1974 | La Borde |
| 3,823,924 | A | 7/1974 | Hoon, Jr. |
| 3,844,936 | A | 10/1974 | Newson |
| 3,888,633 | A | 6/1975 | Grosboll et al. |
| 3,892,583 | A | 7/1975 | Winter et al. |
| 3,898,180 | A | 8/1975 | Crooks et al. |
| 3,914,351 | A | 10/1975 | McKeown |
| 3,924,807 | A | 12/1975 | Morgan |
| 3,947,347 | A | 3/1976 | Mitchell |
| 3,960,508 | A | 6/1976 | Bessant et al. |
| 3,962,078 | A | 6/1976 | Hirs |
| 3,992,282 | A | 11/1976 | Grosboll et al. |
| 4,005,985 | A | 2/1977 | Hutson, Jr. |
| D243,531 | S | 3/1977 | Strigle, Jr. |
| 4,029,482 | A | 6/1977 | Postma et al. |
| RE29,314 | E | 7/1977 | Carlson et al. |
| RE29,315 | E | 7/1977 | Carlson et al. |
| 4,033,727 | A | 7/1977 | Vautrain |
| 4,041,113 | A | 8/1977 | McKeown |
| 4,072,736 | A | 2/1978 | Fattinger |
| 4,086,307 | A | 4/1978 | Glaspie |
| 4,113,810 | A | 9/1978 | Ikawa |
| 4,149,862 | A | 4/1979 | Sewell, Sr. |
| 4,188,197 | A | 2/1980 | Amberkar et al. |
| 4,197,205 | A | 4/1980 | Hirs |
| 4,200,532 | A | 4/1980 | Iwatani |
| 4,203,935 | A | 5/1980 | Hackenjos |
| 4,251,239 | A | 2/1981 | Clyde et al. |
| 4,275,019 | A | 6/1981 | Bednarski |
| 4,285,910 | A | 8/1981 | Kennedy, Jr. |
| 4,329,318 | A | 5/1982 | Le Grouyellec et al. |
| 4,342,643 | A | 8/1982 | Kyan |
| 4,374,020 | A | 2/1983 | Trevino et al. |
| 4,378,292 | A | 3/1983 | Haase |
| 4,380,529 | A | 4/1983 | Gupta |
| 4,402,832 | A | 9/1983 | Gerhold |
| 4,425,285 | A | 1/1984 | Shimoi |
| 4,443,559 | A | 4/1984 | Smith, Jr. |
| 4,457,849 | A | 7/1984 | Heinze |
| 4,478,721 | A | 10/1984 | Gerhold |
| 4,483,771 | A | 11/1984 | Koch |
| 4,487,727 | A | 12/1984 | Ballato, Jr. |
| 4,504,396 | A | 3/1985 | Vardi et al. |
| 4,511,519 | A | 4/1985 | Hsia |
| 4,519,960 | A | 5/1985 | Kitterman |
| 4,522,767 | A | 6/1985 | Billet |
| 4,537,731 | A | 8/1985 | Billet |
| 4,554,114 | A | 11/1985 | Glen |
| 4,568,595 | A | 2/1986 | Morris |
| 4,569,821 | A | 2/1986 | Duperray et al. |
| 4,579,647 | A | 4/1986 | Smith |
| 4,581,299 | A | 4/1986 | Jager |
| 4,615,796 | A | 10/1986 | Kramer |
| 4,642,089 | A | 2/1987 | Zupkas et al. |
| 4,642,397 | A | 2/1987 | Zinnen et al. |
| 4,668,442 | A | 5/1987 | Lang |
| 4,669,890 | A | 6/1987 | Peyrot |
| 4,681,674 | A | 7/1987 | Graven et al. |
| 4,691,031 | A | 9/1987 | Suciu et al. |
| 4,708,852 | A | 11/1987 | Helbling, Jr. et al. |
| 4,711,930 | A | 12/1987 | Hoelderick et al. |
| 4,716,066 | A | 12/1987 | Wymann |
| 4,719,090 | A | 1/1988 | Masaki |
| 4,724,593 | A | 2/1988 | Lang |
| 4,726,825 | A | 2/1988 | Natale |
| 4,731,205 | A | 3/1988 | McNulty |
| 4,775,460 | A | 10/1988 | Reno |
| 4,788,040 | A | 11/1988 | Campagnolo et al. |
| 4,798,676 | A | 1/1989 | Matkovich |
| 4,810,685 | A | 3/1989 | Twigg et al. |
| 4,830,736 | A | 5/1989 | Hung et al. |
| 4,842,920 | A | 6/1989 | Banai |
| 4,849,569 | A | 7/1989 | Smith, Jr. |
| 4,859,642 | A | 8/1989 | Hoelderick et al. |
| 4,863,606 | A | 9/1989 | Ryall |
| 4,863,712 | A | 9/1989 | Twigg et al. |
| 4,880,541 | A | 11/1989 | Chiron et al. |
| 4,938,422 | A | 7/1990 | Koves |
| 4,950,834 | A | 8/1990 | Arganbright et al. |
| 4,954,251 | A | 9/1990 | Barnes et al. |
| 4,968,651 | A | 11/1990 | Crabtree |
| 4,971,771 | A | 11/1990 | Stahl |
| 4,982,022 | A | 1/1991 | Smith, Jr. |
| 4,985,211 | A | 1/1991 | Akihama et al. |
| 5,013,426 | A | 5/1991 | Dang Vu et al. |
| 5,017,542 | A | 5/1991 | Matan et al. |
| 5,043,506 | A | 8/1991 | Crossland |
| 5,055,627 | A | 10/1991 | Smith, Jr. et al. |
| 5,104,546 | A | 4/1992 | Filson et al. |
| 5,113,015 | A | 5/1992 | Palmer et al. |
| 5,118,873 | A | 6/1992 | Smith, Jr. |
| 5,122,276 | A | 6/1992 | Loikits |
| 5,143,700 | A | 9/1992 | Anguil |
| D331,793 | S | 12/1992 | Erwes |
| 5,177,961 | A | 1/1993 | Whittenberger |
| 5,188,772 | A | 2/1993 | Yu |
| 5,189,001 | A | 2/1993 | Johnson |
| D334,970 | S | 4/1993 | Tominaga |
| D334,971 | S | 4/1993 | Tominaga |
| 5,202,027 | A | 4/1993 | Stuth |
| 5,202,097 | A | 4/1993 | Poussin |
| 5,217,603 | A | 6/1993 | Inoue et al. |
| 5,217,616 | A | 6/1993 | Sanyal |
| 5,229,015 | A | 7/1993 | Keep |
| 5,235,102 | A | 8/1993 | Palmer et al. |
| 5,243,115 | A | 9/1993 | Smith, Jr. et al. |
| 5,248,415 | A | 9/1993 | Masuda |
| 5,248,836 | A | 9/1993 | Bakshi et al. |
| D345,410 | S | 3/1994 | Del Prete |
| 5,298,226 | A | 3/1994 | Nowobilski |
| 5,304,423 | A | 4/1994 | Niknafs et al. |
| 5,326,512 | A | 7/1994 | Stillwagon et al. |
| 5,336,656 | A | 8/1994 | Campbell |
| 5,368,722 | A | 11/1994 | Bartholdy |
| 5,384,300 | A | 1/1995 | Feeley et al. |
| 5,384,302 | A | 1/1995 | Gerdes et al. |
| 5,399,535 | A | 3/1995 | Whitman |
| 5,401,398 | A | 3/1995 | McManus |
| 5,409,375 | A | 4/1995 | Butcher |
| 5,411,681 | A | 5/1995 | Seah |
| 5,446,223 | A | 8/1995 | Smith, Jr. |
| 5,454,947 | A | 10/1995 | Olapinski et al. |
| 5,476,978 | A | 12/1995 | Smith, Jr. et al. |
| 5,510,056 | A | 4/1996 | Jacobs et al. |
| 5,512,530 | A | 4/1996 | Gerdes et al. |
| 5,523,503 | A | 6/1996 | Funk et al. |
| 5,538,544 | A | 7/1996 | Nowobilski et al. |
| 5,543,088 | A | 8/1996 | Halbirt |
| 5,558,029 | A | 9/1996 | Peake |
| 5,599,363 | A | 2/1997 | Percy |
| 5,624,547 | A | 4/1997 | Sudhakar et al. |
| D381,394 | S | 7/1997 | Lex, Jr. et al. |
| 5,660,715 | A | 8/1997 | Trimble et al. |
| 5,670,095 | A | 9/1997 | Southam |
| 5,690,819 | A | 11/1997 | Chianh |
| 5,707,513 | A | 1/1998 | Jowett |
| 5,766,290 | A | 6/1998 | Zievers et al. |
| 5,767,470 | A | 6/1998 | Cha |
| 5,779,886 | A | 7/1998 | Couture |
| 5,779,993 | A | 7/1998 | Gentry |
| 5,785,851 | A | 7/1998 | Morris et al. |
| 5,799,596 | A | 9/1998 | Peake |

(56) References Cited

U.S. PATENT DOCUMENTS

| | | |
|---|---|---|
| 5,817,594 A | 10/1998 | McNamara et al. |
| 5,853,579 A | 12/1998 | Rummier et al. |
| 5,853,582 A | 12/1998 | Grangeon et al. |
| 5,866,736 A | 2/1999 | Chen |
| 5,873,998 A | 2/1999 | Grangeon et al. |
| 5,895,572 A | 4/1999 | Joulin et al. |
| 5,901,575 A | 5/1999 | Sunder |
| 5,910,241 A | 6/1999 | McNamara et al. |
| 5,943,969 A | 8/1999 | Peake |
| 5,972,214 A | 10/1999 | Callebert et al. |
| 5,980,739 A | 11/1999 | Jowett |
| 6,019,810 A | 2/2000 | Phillips |
| 6,024,871 A | 2/2000 | Harter et al. |
| 6,033,629 A | 3/2000 | Friederick et al. |
| 6,036,743 A | 3/2000 | Butcher et al. |
| 6,096,278 A | 8/2000 | Gary |
| 6,110,389 A | 8/2000 | Horowitz |
| 6,117,812 A | 9/2000 | Gao et al. |
| 6,153,094 A | 11/2000 | Jowett |
| 6,156,197 A | 12/2000 | Dessapt et al. |
| 6,242,661 B1 | 6/2001 | Podrebarac et al. |
| 6,258,900 B1 | 7/2001 | Glover et al. |
| 6,262,131 B1 | 7/2001 | Arcuri et al. |
| 6,284,022 B1 | 9/2001 | Sachweh et al. |
| 6,291,603 B1 | 9/2001 | Glover et al. |
| 6,315,972 B1 | 11/2001 | Mehdizadeh et al. |
| 6,352,579 B1 | 3/2002 | Hirata et al. |
| 6,371,452 B1 | 4/2002 | Shojaie |
| 6,379,032 B1 | 4/2002 | Sorensen |
| 6,387,534 B1 | 5/2002 | Niknafs |
| 6,402,959 B1 | 6/2002 | Dessapt et al. |
| 6,454,948 B2 | 9/2002 | Ferschneider et al. |
| D465,257 S | 11/2002 | Van Olst |
| 6,521,562 B1 | 2/2003 | Clem et al. |
| 6,524,849 B1 | 2/2003 | Adams |
| 6,583,329 B1 | 6/2003 | Podrebarac |
| 6,630,078 B2 | 10/2003 | Kourtakis et al. |
| 6,631,890 B1 | 10/2003 | Lau |
| 6,713,772 B2 | 3/2004 | Goodman et al. |
| 6,797,175 B2 | 9/2004 | Hotier |
| 6,811,147 B2 | 11/2004 | Lau |
| 6,835,224 B2 | 12/2004 | Cheng |
| 6,852,227 B1 | 2/2005 | Petrone |
| 6,890,878 B2 | 5/2005 | Moore |
| 7,014,175 B2 | 3/2006 | Honnell |
| 7,125,490 B2 | 10/2006 | Clendenning et al. |
| 7,255,848 B2 | 8/2007 | Deluga et al. |
| 7,255,917 B2 | 8/2007 | Rochlin et al. |
| 7,265,189 B2 | 9/2007 | Glover |
| 7,303,668 B2 | 12/2007 | Liao |
| 7,314,551 B2 | 1/2008 | Frey et al. |
| 7,390,403 B2 | 6/2008 | Siwak |
| 7,393,510 B2 | 7/2008 | Glover |
| 7,427,385 B2 | 9/2008 | Scheirer et al. |
| 7,488,413 B2 | 2/2009 | Badreddine |
| 7,527,671 B1 | 5/2009 | Stuecker et al. |
| 7,544,288 B1 | 6/2009 | Cook |
| 7,566,428 B2 * | 7/2009 | Warner ................. B01J 8/0453 |
| | | 422/310 |
| 7,632,320 B2 | 12/2009 | Tonkovich et al. |
| 7,637,485 B2 | 12/2009 | Honnell |
| 7,722,832 B2 | 5/2010 | Glover et al. |
| 7,741,502 B2 | 6/2010 | Lecocq et al. |
| 7,748,688 B2 | 7/2010 | Bessettes |
| 8,062,521 B2 | 11/2011 | Glover |
| 8,241,717 B1 | 8/2012 | Anderson |
| 8,282,890 B2 | 10/2012 | Niknafa et al. |
| 8,293,195 B2 | 10/2012 | Blanchard |
| 8,313,709 B2 | 11/2012 | Glover |
| D672,009 S | 12/2012 | Flournoy |
| 8,500,852 B2 | 8/2013 | Galbraith |
| 8,524,076 B2 | 9/2013 | Yang |
| 8,524,164 B2 | 9/2013 | Glover |
| 8,550,157 B2 | 10/2013 | O'Malley |
| 8,663,474 B2 | 3/2014 | Niazi |
| D705,499 S | 5/2014 | Zamarripa |
| 9,056,268 B2 | 6/2015 | Jones et al. |
| 9,101,863 B2 | 8/2015 | Glover |
| 9,205,392 B2 | 12/2015 | Byl et al. |
| 9,352,292 B2 | 5/2016 | Solantie et al. |
| D780,286 S | 2/2017 | Ausner |
| 9,732,774 B1 | 8/2017 | Glover |
| 10,054,140 B2 | 8/2018 | Glover et al. |
| 10,161,428 B2 | 12/2018 | Glover et al. |
| 10,407,348 B2 | 9/2019 | Osborne |
| 10,421,067 B2 | 9/2019 | Glover |
| 10,421,068 B2 | 9/2019 | Glover |
| 10,449,531 B2 | 10/2019 | Glover |
| 10,500,581 B1 | 12/2019 | Glover |
| 10,525,456 B2 | 1/2020 | Glover |
| 10,543,483 B2 | 1/2020 | Glover |
| 10,557,486 B2 | 2/2020 | Glover et al. |
| 10,655,654 B2 | 5/2020 | Glover et al. |
| 10,662,986 B2 | 5/2020 | Glover |
| 10,738,806 B2 | 8/2020 | Glover |
| 10,744,426 B2 | 8/2020 | Glover |
| 10,864,465 B2 | 12/2020 | Boyd |
| 10,876,553 B2 | 12/2020 | Glover et al. |
| 10,920,807 B2 | 2/2021 | Glover et al. |
| 11,000,785 B2 | 5/2021 | Glover et al. |
| 11,156,240 B2 | 10/2021 | Glover et al. |
| 11,752,477 B2 * | 9/2023 | Glover .................. C10G 67/02 |
| | | 208/88 |
| 11,754,100 B2 | 9/2023 | Glover et al. |
| 12,247,596 B2 | 3/2025 | Glover et al. |
| 2001/0015336 A1 | 8/2001 | Glover |
| 2001/0042928 A1 | 11/2001 | Nagaoka |
| 2002/0059786 A1 | 5/2002 | Nagaoka |
| 2002/0092414 A1 | 7/2002 | Nagaoka |
| 2002/0146358 A1 | 10/2002 | Smith et al. |
| 2003/0125594 A1 | 7/2003 | Moore |
| 2003/0146524 A1 | 8/2003 | Niknafs |
| 2004/0031729 A1 | 2/2004 | Meier et al. |
| 2004/0043493 A1 | 3/2004 | Kobayashi |
| 2004/0084352 A1 | 5/2004 | Meier et al. |
| 2004/0192862 A1 | 9/2004 | Glover et al. |
| 2004/0225085 A1 | 11/2004 | Glover et al. |
| 2005/0211644 A1 | 9/2005 | Goldman |
| 2005/0240038 A1 | 10/2005 | Gobbel et al. |
| 2005/0255014 A1 | 11/2005 | Glover |
| 2006/0009648 A1 | 1/2006 | Gobbel et al. |
| 2006/0108274 A1 | 5/2006 | Frey et al. |
| 2006/0196826 A1 | 9/2006 | Glover |
| 2006/0251555 A1 | 11/2006 | Warner et al. |
| 2006/0275185 A1 | 12/2006 | Tonkovich et al. |
| 2006/0292046 A1 | 12/2006 | Fruchey et al. |
| 2007/0158277 A1 | 7/2007 | Bachand et al. |
| 2007/0187314 A1 * | 8/2007 | Sambrook .......... B01D 39/2068 |
| | | 48/198.3 |
| 2007/0265357 A1 | 11/2007 | Iversen et al. |
| 2008/0044316 A1 | 2/2008 | Glover |
| 2008/0245743 A1 | 10/2008 | Dew |
| 2008/0257804 A1 | 10/2008 | Dew |
| 2008/0257805 A1 | 10/2008 | Dew |
| 2008/0296216 A1 | 12/2008 | Glover |
| 2009/0044702 A1 | 2/2009 | Adamek et al. |
| 2009/0146339 A1 | 6/2009 | Malone et al. |
| 2009/0211441 A1 | 8/2009 | Reyes et al. |
| 2009/0283479 A1 | 11/2009 | Warner et al. |
| 2010/0209315 A1 | 8/2010 | Niknafs |
| 2010/0243519 A1 | 9/2010 | Glover et al. |
| 2010/0243520 A1 | 9/2010 | Glover et al. |
| 2011/0200478 A1 | 8/2011 | Billiet |
| 2012/0211430 A1 | 8/2012 | Choi |
| 2012/0211438 A1 | 8/2012 | Glover |
| 2012/0237434 A1 | 9/2012 | Blanchard et al. |
| 2013/0178627 A1 | 7/2013 | Freitas, Jr. |
| 2013/0184461 A1 | 7/2013 | Freitas, Jr. |
| 2013/0306562 A1 | 11/2013 | Stifter et al. |
| 2014/0291224 A1 | 10/2014 | Fujita |
| 2015/0053627 A1 | 2/2015 | Silin et al. |
| 2015/0129512 A1 | 5/2015 | Thiyagarajan |
| 2016/0136603 A1 | 5/2016 | Parihar et al. |
| 2017/0189834 A1 | 7/2017 | Glover et al. |

(56) References Cited

U.S. PATENT DOCUMENTS

| | | |
|---|---|---|
| 2017/0234339 A1 | 8/2017 | Glover |
| 2018/0008952 A1 | 1/2018 | Glover |
| 2018/0023598 A1 | 1/2018 | Glover |
| 2018/0093207 A1 | 4/2018 | Glover et al. |
| 2018/0093930 A1 | 4/2018 | Freitas, Jr. |
| 2019/0046901 A1 | 2/2019 | Boyd |
| 2019/0048903 A1 | 2/2019 | Glover et al. |
| 2019/0177181 A1 | 6/2019 | St. Germain |
| 2019/0217283 A1 | 7/2019 | Glover et al. |
| 2019/0242412 A1 | 8/2019 | Glover et al. |
| 2019/0285098 A1 | 9/2019 | Glover et al. |
| 2019/0301498 A1 | 10/2019 | Glover |
| 2019/0301499 A1 | 10/2019 | Glover |
| 2019/0358620 A1 | 11/2019 | Glover |
| 2020/0149564 A1 | 5/2020 | Glover |
| 2020/0215524 A1 | 7/2020 | Glover |
| 2020/0338518 A1 | 10/2020 | Bakli et al. |
| 2020/0376413 A1 | 12/2020 | Glover |
| 2020/0376414 A1 | 12/2020 | Glover |
| 2021/0018022 A1 | 1/2021 | Glover |
| 2022/0042528 A1 | 2/2022 | Glover |
| 2022/0072495 A1 | 3/2022 | Glover |
| 2023/0407892 A1 | 12/2023 | Glover |

FOREIGN PATENT DOCUMENTS

| | | |
|---|---|---|
| CA | 2520071 | 4/2004 |
| CA | 2297113 | 2/2005 |
| CA | 2570527 | 12/2005 |
| CN | 202072546 | 12/2011 |
| CN | 203382593 | 1/2014 |
| DE | 3539195 | 5/1986 |
| EP | 73150 | 10/1933 |
| EP | 260826 | 3/1988 |
| EP | 576096 | 12/1993 |
| EP | 639544 | 2/1995 |
| EP | 651041 | 5/1995 |
| EP | 719578 | 7/1996 |
| EP | 1001837 | 7/1998 |
| EP | 0899011 | 3/1999 |
| EP | 1606038 | 12/2005 |
| EP | 1755766 | 2/2007 |
| EP | 3040119 | 6/2016 |
| EP | 3397364 | 11/2018 |
| EP | 3414003 | 12/2018 |
| GB | 267877 | 1/1927 |
| GB | 374707 | 7/1932 |
| GB | 429616 | 6/1935 |
| GB | 933124 | 8/1963 |
| GB | 1097473 | 1/1968 |
| GB | 1442085 | 7/1976 |
| GB | 2108003 | 5/1983 |
| GB | 2149771 | 6/1985 |
| JP | S49-145763 | 12/1974 |
| JP | S5171840 U | 6/1976 |
| JP | 5237396 | 9/1977 |
| JP | S558819 | 1/1980 |
| JP | SHO 55-43817 | 3/1980 |
| JP | 5567309 | 5/1980 |
| JP | 5817818 | 2/1983 |
| JP | S58 (1983)-024308 | 2/1983 |
| JP | S61 (1986)-134300 | 6/1986 |
| JP | 61132097 | 8/1986 |
| JP | S61 (1986)-180818 | 8/1986 |
| JP | 62114643 | 5/1987 |
| JP | SHO 62-114643 | 5/1987 |
| JP | S63 (1988)-043632 | 3/1988 |
| JP | 4187297 | 7/1992 |
| JP | H06 (1994)-205922 | 7/1994 |
| JP | 1028876 | 2/1998 |
| JP | HEI 10-028876 | 2/1998 |
| JP | 1057821 | 3/1998 |
| JP | HEI 10-057821 | 3/1998 |
| JP | 11128734 | 5/1999 |
| JP | 2000-028876 | 1/2000 |
| JP | 2000-246048 | 9/2000 |
| JP | 2003-120257 | 4/2003 |
| JP | 2004-515432 | 5/2004 |
| JP | 2004-250554 | 9/2004 |
| JP | 2004-530746 | 10/2004 |
| JP | 2004-537406 | 12/2004 |
| JP | 2006-55749 | 3/2006 |
| JP | 2006-205068 | 8/2006 |
| JP | 2006-523139 | 10/2006 |
| JP | 5543817 | 7/2014 |
| JP | 2015-085208 | 5/2015 |
| JP | 2016-13748 | 8/2016 |
| JP | 2018-61955 | 4/2018 |
| JP | 6324420 | 5/2018 |
| JP | 2019-19023 | 2/2019 |
| KR | 10-2006-0016746 | 2/2006 |
| KR | B0747359 | 8/2007 |
| KR | 1221298 | 1/2013 |
| KR | B1417049 | 7/2014 |
| KR | 10-2239550 | 4/2021 |
| NL | 1009499 | 1/2000 |
| NZ | 542787 | 6/2009 |
| WO | 99/03561 | 1/1999 |
| WO | 2001/001536 | 1/2001 |
| WO | 2002/045838 | 6/2002 |
| WO | 2002/079346 | 10/2002 |
| WO | 2003/013725 | 2/2003 |
| WO | 2004/094039 | 11/2004 |
| WO | 2005/058472 | 6/2005 |
| WO | 2005/123221 | 12/2005 |
| WO | 2006/127671 | 11/2006 |
| WO | 2010/149908 | 12/2010 |
| WO | 2015/037730 | 3/2015 |
| WO | 2015/200513 | 12/2015 |
| WO | 2017/117492 | 7/2017 |
| WO | 2017/139597 | 8/2017 |
| WO | 2019/020705 | 1/2019 |
| WO | 2022/056154 | 3/2022 |
| ZA | 200508048 | 11/2006 |

OTHER PUBLICATIONS

Australian Government, IP Australia, Examination Report No. 2 for Standard Patent Application, Issued in connection to AU2016381170; 3 pages; Nov. 8, 2019; Australia.

Japanese Patent Office; Final Rejection, issued in connection to application No. 2017-226648; Feb. 26, 2020; 6 pages; Japan.

European Patent Office; Communication pursuant to Article 94(3) EPC, issued in connection to EP16834162.6; Feb. 4, 2020; 7 pages; Europe.

Japanese Patent Office; Office Action, issued in connection to application No. 2018-553847; Feb. 26, 2020; 8 pages; Japan.

Intellectual Property Office of Singapore; Invitation to Respond to Written Opinion, issued in connection with application No. 11201805491X; Mar. 3, 2020; 6 pages; Singapore.

Indian Patent Office; Examination Report, issued in connection to application No. 201837023720; Jan. 23, 2020; 6 pages; India.

Intellectual Property Office of Singapore; Invitation to Respond to Written Opinion, issued in connection with application No. 11201805367W; Mar. 2, 2020; 34 pages; Singapore.

Canadian Intellectual Property Office; Office Action, issued in connection to application No. 3009825; Apr. 22, 2020; 3 pages; Canada.

Japanese Patent Office; Statement of Submission of Publication by third part, filed in connection to application No. 2019-140168; Aril 21, 2020; 1 page; Japan.

Kabe, Toshiaki; Hydrotreating—Science and Technology; Oct. 20, 2000; pp. 367-379; IPC KK.

Canadian Intellectual Property Office; Examiner Report, issued in connection to application No. CA3009845; May 20, 2020; 3 pages; Canada.

Japanese Patent Office; Statement of Submission of Publication by third part, filed in connection to application No. 2018-541647; Jun. 25, 2020; 3 page; Japan.

(56) References Cited

OTHER PUBLICATIONS

Korean Intellectual Property Office; Office Action, issued in connection to patent application No. 10-2020-7011514; Jul. 20, 2020; 11 pages; Korea.
European Patent Office; Communication Pursuant to Article 94(3)EPC, issued in connection to application No. 182013703.6; Jul. 27, 2020; 5 pages; Europe.
Japanese Patent Office; Office Action, issued in connection to application No. 2019-140168; Sep. 2, 2020; 9 pages; Japan.
European Patent Office; Communication Pursuant to Article 94(3) EPC, issued in conneciton to application No. EP15192642.5; Sep. 10, 2020; 5 pages; Europe.
Intellectual Property Office of Singapore; Invitation to Respond to Written Opinion, issued in connection to application No. 11201805491X; Aug. 18, 2020; 6 pages; Singapore.
Japanese Patent Office; Final Rejection, issued in connection to application No. 2018-541647; Jul. 22, 2020; 4 pages; Japan.
Korean Intellectual Property Office; Second Notificaiton of Provisional Rejection, issued in connection to application No. 10-2018-7021988; Oct. 26, 2020; 12 pages; Korea.
Japanese Patent Office; Final Office Action, issued in connection to application No. 2018-553847; Jan. 6, 2021; 11 pages; Japan.
Canadian Patent Office; Office Action, issued in connection to application No. 3009825; Feb. 17, 2021; 3 pages; Canada.
Korean Intellectual Property Office; Notice of First Refusal Ruling, issued in connection to application No. 10-2018-7021988; Mar. 26, 2021; 8 pages; Korea.
Japanese Patent Office; Final Office Action, issued in connection to application No. 2017-226648; Feb. 24, 2021; 29 pages; Japan.
Nippon Ketjen Co., Ltd; Summary of Invalidation Reason, filed in connection to Korean patetn No. 10-1417049; Mar. 15, 2021; 35 pages; Korea.
Intellectual Property Corporation of Malaysia; Substantive Examination Adverse Report (Section 30 (1) / 30(2)), issued in connection with application No. PI2018702533; Apr. 27, 2021; 3 pages; Malaysia.
European Patent Office; Communication Pursuant to Article 94(3) EPC, issued in connection to application No. EP18201370.6; May 19, 2021; 4 pages; Europe.
European Patent Office; Communication Pursuant to Article 94(3) EPC, issued in connection to application No. EP17706648.7; Jul. 1, 2021; 7 pages; Europe.
Japanese Patent Office; Observation, issued in connection to JP2020-110241; May 28, 2021; 36 pages; Japan.
Petrotech, vol. 4, p. No. 4; pp. 295-394; Apr. 1981.
Japanese Patent Office; Office Action, issued in connection to application No. 2020-110241; Jul. 21, 2021; 8 pages; Japan.
Japanese Patent Office; Final Rejection, issued in connection to application No. 2019-140168; Jul. 21, 2021; 7 pages; Japan.
Woven Metal Products, Inc.; Perforated Plate; https://wovenmetal.com/reactor-internals/axialdownflow/catalyst-hold-downfloating-screens; printed Aug. 30, 2021; 2 pages.
Christy Catalytics; Catalyst Support Hold Down—Secondary Reformers; https://www.christycatalytics.com/our-blog/bid/31695/catalyst-support-hold-down-secondary-reformers; Dec. 3, 2009; 4 pages.
Crystaphase; CatTrap; https://crystaphase.com/solutions/cattrap/; Aug. 27, 2021; 3 pages.
Korean Intellectual Property Office; Notification of Reason for Refusal, issued in connection to application No. 10-2021-7015042; Aug. 27, 2021; 7 pages; Korea.
Intellectual Property Office of Singapore; Examination Report, issued in connection with application No. 11201805491X; Sep. 28, 2021; 6 pages; Singapore.
Intellectual Property Corporation of Malaysia; Examination Adverse Report (Section 30(1) / 30(2)), issued in connection with application No. PI2018001178; Oct. 20, 2021; 4 pages; Malaysia.
Japanese Patent Office; Notice of Reasons for Rejection, issued in connection to Appeal Trial No. 2020-016134, application No. 2018-541647; Sep. 22, 2021; 14 pages; Japan.
Japanese Patent Office; Statement of Submission of Publications, filed in connection to JP2020-194305; Oct. 6, 2021; 42 pages; Japan.
Kabe, Toshiaki; Hydrotreating—Science and Technology; Oct. 20, 2000; pp. 341-347; IPC KK.
Korean Intellectual Property Office; Notification of Provisional Rejection, issued in connection to application No. 10-2021-7019648; Sep. 19, 2021; 11 pages; Korea.
European Patent Office; International Search Report, issued in connection to application No. PCT/US2021/049704; Nov. 26, 2021; 4 pages; Europe.
European Patent Office; Written Opinion of the International Searching Authority, issued in connection to application No. PCT/US2021/049704; Nov. 26, 2021; 7 pages; Europe.
Australian Government, Ip Australia, Examination Report No. 1 for Standard Patent Application, Issued in connection to AU2017217834; 3 pages; Nov. 14, 2018; Australia.
Australian Government, Ip Australia, Examination Report No. 1 for Standard Patent Application, Issued in connection to AU2016381170; 3 pages; Apr. 10, 2019; Australia.
Brazilian National Institute of Industrial Property; Technical Examination Report, issued in connection to PI0613275-8; Feb. 25, 2016; 16 pages; Brazil.
Canadian Intellectual Property Office; Official Action, issued in connection with CA3009825; Jun. 18, 2019; 4 pages; Canada.
European Patent Office; PCT International Search Report, Issued in Connection to PCT/US2005/020712; Mar. 3, 2006; 2 pages; Europe.
European Patent Office; PCT International Search Report, Issued in Connection to PCT/US2004/006366; Oct. 20, 2004; 2 pages; Europe.
European Patent Office; PCT International Search Report, Issued in Connection to PCT/US2006/019854; Jan. 17, 2007; 2 pages; Europe.
European Patent Office; PCT Written Opinion of the International Searching Authority, Issued in Connection to PCT/U82006/019854; Jan. 17, 2007; 5 pages; Europe.
European Patent Office; PCT International Search Report, Issued in Connection to PCT/U898/14768; Nov. 26, 1998; 3 pages; Europe.
European Patent Office; PCT International Search Report, Issued in Connection to PCT/US2016/069396; Mar. 31, 2017; 3 pages; Europe.
European Patent Office; PCT Written Opinion of the International Searching Authority, Issued in Connection to PCT/US2016/069396; Mar. 31, 2017; 6 pages; Europe.
European Patent Office; PCT International Search Report, Issued in Connection to PCT/US2017/017398; 5 pages; Europe, (Apr. 4 2017).
European Patent Office; Communicaiton and Search Report, Issued in Connection to EP15192642.5; Jun. 2, 2016; 7 pages; Europe.
European Patent Office; Communicaiton Pursuant to Rules 161(1) and 162 EPC, issued in connection to EP17706648.7; Sep. 19, 2018; 3 pages; Europe.
European Patent Office; Communicaiton Pursuant to Rules 161(1) and 162 EPC, issued in connection to EP16834162.6; Aug. 8, 2018; 3 pages; Europe.
European Patent Office; Communication Pursuant to Article 94(3) EPC, issued in connection to EP15192642.5; Mar. 13, 2019; 5 pages; Europe.
European Patent Office; Communication Pursuant to Article 94(3) EPC, Issued in Connection to EP04716499.1; May 9, 2016; 4 pages; Europe.
European Patent Office; Communication pursuant to Article 94(3) EPC, issued in connection to EP04716499.1; Mar. 10, 2017; 5 pages; Europe.
European Patent Office; Communication Pursuant to Article 94(3) EPC, Issued in Connection to EP04716499.1; Mar. 15, 2013; 4 pages; Europe.
European Patent Office; Summons to attend oral proceedings pursuant to Rule 115(1) EPC, issued in connection to EP04716499.1; Feb. 12, 2018; 6 pages; Europe.
European Patent Office; Extended European Search Report, issued in connection to EP18201370.6; Apr. 9, 2019; 6 pages; Europe.
European Patent Office; Extended European Search Report, issued in connection to EP15192642.5; Jun. 2, 2016; 6 pages; Europe.

(56) References Cited

OTHER PUBLICATIONS

European Patent Office; Communication Pursuant to Article 94(3) EPC, issued in connection to EP98934597.0; Mar. 16, 2009; 3 pages; Europe.
European Patent Office; Communication Pursuant to Article 94(3) EPC, issued in connection to EP98934597.0; Jun. 21, 2006; 4 pages; Europe.
European Patent Office; Communication Pursuant to Article 96(2) EPC, issued in connection to EP98934597.0; Sep. 10, 2004; 4 pages; Europe.
European Patent Office; Communication Pursuant to Article 96(2) EPC, issued in connection to EP98934597.0; Dec. 11, 2002; 3 pages; Europe.
European Patent Office; Communication Pursuant to Article 96(2) EPC, issued in connection to EP98934597.0; Oct. 8, 2001; 2 pages; Europe.
European Patent Office; Communication Pursuant to Article 96(2) EPC, issued in connection to EP05760680.8; Jan. 28, 2009; 6 pages; Europe.
European Patent Office; Communication Pursuant to Article 96(2) EPC, issued in connection to EP05760680.8; Jul. 5, 2010; 5 pages; Europe.
Japanese Patent Office; Notice of Reasons for Rejection, issued in connection to JP2010-246536; Sep. 7, 2012; 8 pages; Japan.
Japan Patent Office; Notice of Reasons for Rejection, issued in connection with JP2010-246536; Nov. 12, 2013; 6 pages; Japan.
Japan Patent Office; Certified Final Rejection, issued in connection with JP2010-246536; Jun. 25, 2014; 2 pages; Japan.
Japan Patent Office; Decision to Dismiss Amendment, issued in connection to JP2010-246536; Jun. 25, 2014; 3 pages; Japan.
Japanese Patent Office; Notice of Reasons for Rejection of Japanese Patent Application 2016-017373; Dec. 7, 2016; 11 pages; Japan.
Japanese Patent Office; Certified Copy of Decision of Dismissal of Amendment, issued in connection to JP2014-217190; 4 pages; Japan, Jul. 26, 2017.
Japanese Patent Office; Certified Copy of Final Rejection, issued in connection to JP2014-217190; 3 pages; Japan, Jul. 26, 2017.
Japanese Patent Office; Notice of Reasons for Rejection, issued in connection to JP2014-217190; Aug. 31, 2016; 6 pages; Japan.
Japanese Patent Office; Notice of Reasons for Rejection, issued in connection to JP2014-217190; Sep. 30, 2015; 8 pages; Japan.
Japanese Patent Office; Observation, issued in connection to JP2017-226648; Jul. 17, 2018; 50 pages; Japan.
Japanese Patent Office; Notice of Reasons for Rejection, issued in connection to JP2017-226648; Jan. 31, 2019; 10 pages; Japan.
Japanese Patent Office; Notice of Resons for Rejection, issued in connection to JP2018-553847; May 29, 2019; 10 pages; Japan.
Canadian Intellectual Property Office; Office Action, issued in connection to application No. 3,192,003; May 2, 2024; 4 pages; Canada.
Intellectual Property Office of Singapore, Written Opinion, issued in connection to application No. 10202007685S; Jul. 17, 2022; 8 pages; Singapore.
European Patent Office; Communication Pursuant to Rules 161(1) and 162 EPC, issued in connection to application No. EP21794038.6; 3 pages; Apr. 18, 2023; Europe.
European Patent Office; Communication Pursuant to Article 94(3) EPC, issued in connection to EP18201370.6; 4 pages; Jun. 17, 2022; Europe.
Japanese Patent Office; Final Rejection, issued in connection to application No. 2020-110241; Jun. 8, 2022; 6 pages; Japan.
Ancheyta, Jorge et al.; Asphaltenes: Chemical Transformation during Hydroprocessing of Heavy Oils; Chemical Industries/124; CRC Press; 2009; 5 pages.
Third Party Submission; filed in connection to application No. 2020-110241; May 18, 2022; 39 pages; Japan.
Japanese Patent Office; Office Action, issued in connection to application No. 2021-116861; Aug. 24, 2022; 10 pages; Japan.
Mexican Patent Office; Office Action, issued in connection to application No. MX/a/2018/007939; Mar. 21, 2023; 6 pages; Mexico.
Intellectual Property Office of Singapore; Refusal of Request for Examinaton Review Report, issued in connection with application No. 11201805491X; May 11, 2023; 8 pages; Singapore.
Intellectual Property Office of Singapore; Notice of Intention to Refuse Patent Application, issued in connection with application No. 11201805491X; Sep. 28, 2021; 6 pages; Singapore.
Japanese Patent Office; Office Action, issued in connection to application No. 2020-194305; Oct. 19, 2022; 13 pages; Japan.
Japanese Patent Office; Office Action, issued in connection to application No. 2020-194305; Jan. 19, 2022; 4 pages; Japan.
European Patent Office; Communication pursuant to Article 94(3) EPC, issued in connection to application No. 18201370.6; Feb. 8, 2023; 4 pages; Europe.
Mexican Patent Office; Office Action, issued in connection to application No. MX/a/2018/007939; Aug. 15, 2023; 6 pages; Mexico.
Mexican Patent Office; Office Action, issued in connection to application No. MX/a/2018/007939; Jan. 3, 2024; 7 pages; Mexico.
Intellectual Property Office of Singapore; Invitation to Respond to Written Opinion with Search Report, issued in connection with application No. 10202113738Q; Sep. 18, 2023; 11 pages; Singapore.
Intellectual Property Office of Singapore; Notice of Intention to Refuse Patent Application, issued in connection with application No. 10202113738Q; Feb. 20, 2024; 8 pages; Singapore.
Japanese Patent Office; Certified Final Rejection, issued in connection to application No. 2020-194305; Jun. 28, 2023; 5 pages; Japan.
Korean Intellectual Property Office; Notification of Provisional Rejection, issued in connection to application No. 10-2021-7015042; Aug. 31, 2022; 5 pages; Korea.
Mexican Patent Office; Office Action, issued in connection to application No. MX/a/2018/008258; Sep. 5, 2023; 6 pages; Mexico.
Mexican Patent Office; Office Action, issued in connection to application No. MX/a/2018/008258; Jan. 12, 2024; 7 pages; Mexico.
Intellectual Property Office of Singapore; Invitation to Respond to Written Opinion, issued in connection with application No. 10202007685S; Mar. 4, 2024; 7 pages; Singapore.
Schildhauer; Application of Film-Flow-Monoliths . . . , Technical Univesity Delft; Julianalaan 136, NL-2628 BL Delft; The Netherlands; 1 page; Oct. 29, 2003.
Scheffler, Michael; Cellular Ceramics: Structure, Manufacturing, Properties and Applications; Die Beutsche Bibliotheck; 2005; 5 pages; Germany.
Schlichting, Boundary-Layer Theory; McGraw-Hill; (Translation of Grenzschicht-Theorie, Translated by Dr. J. Kestin), 1979; pp. 230-234.
Selee Corporation; Product Brochure; 6 pages; 1997.
Selee Corporation Home Page; Internet; downloaded Nov. 14, 1996; 3 pages.
Selee Corporation; Ceramic Foam for Thermal/Kiln Furniture Applications; Ceramic Foam Kiln Furniture Phusical Property Data Sheet; Nov. 14, 1996; 2 pages.
Snyder Filtration; Nanofiltration Membranes; Retrieved Jun. 15, 2016 from: http://synderfiltration.com/nanofiltration/membranes/; 4 pages; Membrane Technology.
Sulzer; Structured Packings for Separation and Reactive Distillation Brochure; pp. 2-27; 2002-2003.
Sweeting et al.; High Surface Reticulated Ceramics for Catalytic Applications; Mat., Res. Soc. Symp. Proc., vol. 549; pp. 17-23; 1999.
Sweeting et al.; Reticulated Ceramics for Catalyst Support Applications; Hi-Tech Ceramics, Inc.; Nov. 30, 1994; 12 pages.
Tan-Atichat and Nagib, "Interaction of free-stream turbulence with screens and grids: a balance between turbulence scales" J. Fluid Mech (1982), vol. 114, pp. 501-528; Great Britain.
Wadley; Cellular Metals Manufacutring; Advanced Engineering Materials; 4; No. 10; pp. 726-733; 2002.
Woodward et al.; Akzo Chemicals' Guard Bed Technology; 16 pages; 1991.
U.S. Patent and Trademark Office; Non-Final Office Action, Issued in Connection with U.S. Appl. No. 11/893,190; Mar. 10, 2010; 6 pages; U.S.
Applicant; Amendment and Response, Filed in Connection with U.S. Appl. No. 11/893,190; Aug. 20, 2010; 4 pages; U.S.

(56) References Cited

OTHER PUBLICATIONS

U.S. Patent and Trademark Office; Final Office Action, Issued in Connection with U.S. Appl. No. 11/893,190; Nov. 3, 2010; 5 pages; U.S.
Applicant; Response to Final Office Action, Filed in Connection with U.S. Appl. No. 11/893,190; Jan. 3, 2011; 5 pages; U.S.
U.S. Patent and Trademark Office; Non-Final Office Action, Issued in Connection with U.S. Appl. No. 11/893,190; Jan. 19, 2011; 5 pages; U.S.
Applicant; Amendment and Response, Filed in Connection with U.S. Appl. No. 11/893,190; Jul. 19, 2011; 4 pages; U.S.
U.S. Patent and Trademark Office; Final Office Action, Issued in Connection with U.S. Appl. No. 11/893,190; Sep. 22, 2011; 6 pages; U.S.
Applicant; Amendment and Response, Filed in Connection with U.S. Appl. No. 11/893,190; Dec. 16, 2011; 5 pages; U.S.
U.S. Patent and Trademark Office; Non-Final Office Action, Issued in Connection with U.S. Appl. No. 11/893,190; Jan. 27, 2012; 7 pages; U.S.
U.S. Patent and Trademark Office; Non-Final Office Action, Issued in Connection with U.S. Appl. No. 11/893,190; Feb. 6, 2012; 7 pages; U.S.
Applicant; Amendment and Response, Filed in Connection with U.S. Appl. No. 11/893,190; Aug. 3, 2012; 6 pages; U.S.
U.S. Patent and Trademark Office; Final Office Action, Issued in Connection with U.S. Appl. No. 11/893,190; Oct. 23, 2012; 9 pages; U.S.
Applicant; Amendment and Response, Filed in Connection with U.S. Appl. No. 11/893,190; Dec. 24, 2012; 8 pages; U.S.
U.S. Patent and Trademark Office; Advisory Action Before the Filing of an Appeal Brief, Issued in Connection with U.S. Appl. No. 11/893,190; Jan. 11, 2013; 3 pages; U.S.
Applicant; Amendment and Response, Filed in Connection with U.S. Appl. No. 11/893,190; Feb. 25, 2013; 4 pages; U.S.
U.S. Patent and Trademark Office; Notice of Allowance and Fee(s) Due, Issued in Connection with U.S. Appl. No. 11/893,190; May 2, 2013; 8 pages; U.S.
U.S. Court of Appeals Federal Circuit; *Purdue Pharma L.P.* v. *Faulding Inc.*, 56 USPQ2d 1481 (CA FC 2000); Oct. 25, 2000; 11 pages.
Selected relevant excerpts from file history of U.S. Appl. No. 11/893,190, filed Aug. 15, 2007 and assigned to Applicant for present application.
Notice of Allowance for U.S. Appl. No. 10/867,015 (now U.S. Pat. No. 7,393,510, issued Jul. 1, 2008).
Observations submitted in connection to JP2017-226648; Jul. 17, 2018; 50 pages; Japan.
New Zealand Intellectual Property Office; Further Examination Report, issued in connection to application No. 743891; Jun. 24, 2019; 9 pages; New Zealand.
Japanese Patent Office; Observation, issued in connection to JP2018-541647; Jun. 19, 2019; 40 pages; Japan.
The Japan Petroleum Institute; Petroleum Refining Process; Kodansha Ltd.; May 20, 1998; 10 pages; Japan.
Chen, Xiaodong et al.; Improving the Strength of ZTA Foams with Different Strategies: Immersion Infiltration and Recoating; www.mdpi.com/journal/material; May 30, 2017; 15 pages.
Intellectual Property Office of Singapore; Written Opinion, issued in connection to application No. 11201805367W; Aug. 16, 2019; 7 pages; Singapore.
Intellectual Property Office of Singapore; Written Opinion, issued in connection to application No. 11201805491X; Aug. 29, 2019; 6 pages; Singapore.
Intellectual Property India; Examination Report, issued in connection to application No. 201837023710; Aug. 28, 2019; 6 pages; India.
Canadian Intellectual Property Office; Official Action and Examination Search Report, issued in connection with CA3009845; Aug. 28, 2019; 4 pages; Canada.

Saint-Gobain Norpro; Denstone® Deltrap® Support Media; 6 pages; printed Oct. 1, 2019; https://www.norpro.saint-gobain.com/support-media/denstone-deltap.
Saint-Gobain Norpro; Tools Help Optimize Selection of Denstone® Bed Support Media; Apr. 4, 2019; 4 pages; https://www.norpro.saint-gobain.com/articles/tools-help-optimize-selection-denstone-bed-support-media-article.
New Zealand Intellectual Property Office; First Examination Report, issued in connection to application No. 743895; Jan. 31, 2019; 5 pages; New Zealand.
New Zealand Intellectual Property Office; First Examination Report, issued in connection to application No. 743891; Nov. 6, 2018; 10 pages; New Zealand.
Behrens et al.; Performance of a Monolith-like Structured; Chem. Biochem. Eng. Q. 15 (2); pp. 49-57; 2001.
Beihai Huihuang Chemical Packing Co. Lts., http://77520.pub.diysite.com/sc.deliver/main/0-4-5/4/0-ma.html?siteid=77520; 10 pages; May 5, 2003.
Butcher; Reticulated Ceramic Foam as a Catalyst Support; Seminar for CatCon '98; Jun. 3-5, 1998; Ohio.
Ceramic Industry Cover page; and Table of Contents; vol. 147, No. 3; 2 pages; Mar. 1997.
Christy Refractories Company; Prox-Svers Catalyst Support Media; Apr. 1995.
Criterion; Technical Bulletin: Loading Your Hydrotreating Reactor for Maximum Activity; Criterion Catalysts & Technologies; 3 pages; 2008.
Fay; A Three-Point Generalization of the Ellipse; International Journal of Mathematical Education in Science and Technology; Jan. 2002; vol. 33, Issue 1; pp. 111-123.
Foseco Home Page; Internet; p. 1-3; Feb. 21, 1997.
Fulton; CE Refresher: Catalyst Engineering, Part 2, Selecting the Catalyst Configuaration; May 1986 Chemical engineering; pp. 97-101.
Gibson; Cellular Solids, MRS Bulletin; www.mrs.org/publications/bulleting; pp. 270-274; Apr. 2003.
Gibson et al.; Cellular Solids: Structure and Properties; Second Edition, Cambridge Solid State Science Series, Cambridge University Press; 71 pages; 1997.
Green et al.; Cellular Ceramics: Intriguing Structures, Novel Properties, and Innovative Applications; www.mrs.org/publications/bulletin; pp. 296-300; Apr. 2003.
Haldor Topsoe, Inc.; Material Safety Data Sheet Inert Topping TK-10; p. 1-4; 1992.
Hickman et al.; Production of Syngas by Direct Catalytic Ocidation of Methane; Science; vol. 256; p. 343-346; Jan. 15, 1993.
Hung et al.; Translation of DE3539195, Hydroprocessing Catalyzer with Specific Geometric Shate; 23 pages; May 2000.
Ivars Peterson's MathLand; Beyond the Ellipse; The Mathematical Association of America; Sep. 2, 1996; 3 pages.
Kim et al.; Effect of Inert Filler Addition on Pore Size and Porosity of Closed-Cell Silicon Oxycarbide Foams; Journal of Materials Science 39; pp. 3513-3515; 2004.
Loehrke and Nagib, Agard Report No. R-598 Experiments on Management of Free-stream Turbulence 1972.
Materials 2017, 10(7), 735; "Improving the Strength of ZTA Foams with Different Strategies: Immersion Infiltration and Recoating;" https://doi.org/10.3390/ma10070735; 15 pages; Jul. 1, 2017.
Mills; Ceramic Technology Provides Refining Solutions, Saint-Gobain Norpro; pp. 1-17; 2003.
Mills; Ceramic Guard Bed Materials; Norton Chemical Process Products Corporation; Jun. 3-5, 1998; 24 pages; US.
Norton Chemical Process Products Corporation, MacroTrap Guard Bed Media; 6 pages: 1998.
Norton Chemical Process Products Copr.; Denstone Inert Catalyst Bed Supports; 10 pages; 1992; Ohio.
NPRA Q&A Session on Refining and Petrochemical Technology; Section B. Hydrotreating; p. 85-101; 1990.
NPRA Q&A Session on Refining and Petrochemical Technology: Section B. Hydrotreating; p. 98-118; 1991.
NPRA Q&A Session on Refining and Petrochemical Technology: Section B. Hydrotreating; p. 104-135; 1992.

(56) References Cited

OTHER PUBLICATIONS

NPRA Q&A Session on Refining and Petrochemical Technology: Section B. Hydrotreating; p. 94-112; 1993.
NPRA Q&A Session on Refining and Petrochemical Technology: Section B. Hydrotreating; p. 98-139; 1994.
NPRA Q&A Session on Refining and Petrochemical Technology: Section B. Hydrotreating; p. 96-123; 1995.
NPRA Q&A Session on Refining and Petrochemical Technology: Section B. Hydrotreating; p. 131-160; 1996.
Olujic et al.; Distillation col. Internals/Configurations for Press . . . , Chem. Biochem, Eng. Q. 17 (4); pp. 301-309; 2003.
Perry's Chemical Engineers' Handbook, 7th Ed., McGraw-Hill, 1997, pp. 6-33-6-34.
Petrotech, vol. 4, pp. 382-383; 1981.
Product Bulletin: Criterion 855 MD "Medallions" Inert Catalyst Support; Aug. 1998; 2 pages.
Queheillalt et al.; Synthesis of Stochastic Open Cell Ni-Based Foams; Scripta Materialia 50; pp. 313-317; 2004.
Rashmi Narayan; Particle Capture from Non-Aqueous Media on Packed Beds; Dept. of Chemical and Materials Engineering; 116 pages; Fall 1996; Edmonton, Alberta.
European Patent Office; Decision to Refuse a European Patent Application, issued in connection to application No. 15192642.5; Jan. 16, 2025; 10 pages; Europe.
Intellectual Property Office of Singapore; Notice of Intention to Refuse Patent Application, issued in connection with application No. 10202007685S; Nov. 8, 2024; 8 pages; Singapore.
Japanese Patent Office; Notice of Reasons for Rejection, issued in connection to application No. 2023-112045; Oct. 2, 2024; 4 pages; Japan.
Mexican Institute of Industrial Property; Office Action, issued in connection to application No. MX/a/2018/008258; Oct. 14, 2024; 7 pages; Mexico.
Intellectual Property Office of Singapore; Invitation to Respond to Written Opinion, issued in connection with application No. 10202301970T; Sep. 5, 2024; 6 pages; Singapore.
Japanese Patent Office; Office Action, issued in connection to application No. JP2023-515777; Jul. 31, 2024; 6 pages; Japan.
European Patent Office; Summons to attend oral proceedings pursuant to Rule 115(1) EPC, issued in connection to application No. 15192642.5; Jun. 7, 2024; 6 pages; Europe.
Brazilian National Institute of Industrial Property; Technical Examination Report, issued in connection to PI0613275-8 ; Feb. 24, 2021; 18 pages; Brazil.
National Institute of Industrial Property of Brazil; Office Action, issued in connection to application No. BR112018013488-0; Feb. 2, 2020; 8 pages; Brazil.
Chilean Patent and Trademark Office; Examiner Report and Search Report, issued in connection to application No. 2131-2018; 25 pages; Aug. 29, 2019; Chile.
Chilean Patent and Trademark Office; Examiner Report No. 2., issued in connection to application No. 1799-2018; Jan. 24, 2020; 14 pages; Chile.
Chilean Patent and Trademark Office; Examiner's Report and Search Report, issued in connection to application No. 1799-2018; Aug. 9, 2019; 17 pages; Chile.
Strom, Laurie A. et al.; Advanced Reticulated Ceramics; Hi-Tech Ceramics; p. 14-19; on or before Jul. 10, 2001.
Sinter Metals; High Porosity SIKA-R . . . IS; Porous Metals Filter Elements; pp. 1-3; on or before Jul. 10, 2001.
Sinter Metals; Hight Porosity Sintered Materials; p. 1-16; on or before Jul. 10, 2001.
Sinter Metals; Tool List, Seamleass SILKA-Elements; pp. 6-7; on or before Jul. 10, 2001.
Mexican Institute of Industrial Property; Office Action, issued in connection to application No. MX/a/2018/007939; May 13, 2024; 5 pages; Mexico.
Mexican Institute of Industrial Property; Office Action, issued in connection to application No. MX/a/2018/008258; May 20, 2024; 7 pages; Mexico.
Korean Intellectual Property Office; Notice of Final Refusal Ruling, issued in connection with application No. 10-2021-7015042; Jul. 23, 2024; 5 pages; Republic of Korea.
European Patent Office; Extended European Search Report, issued in connection to patent application No. 24196803.1; Jun. 10, 2025; 11 pages; Europe.
European Patent Offiec; Communication pursuant to Article 94(3) EPC, issued in connection to patent application No. 17706648.7; Jan. 29, 2025; 5 pages; EUROPE.
Intellectual Property Office of India; Examination Report, issued in connection to patent application No. 202337025702; May 15, 2025; 8 pages; India.
Japan Patent Office; Office Action, issued in connection to 2020-194305; Jan. 15, 2025; 15 pages; JAPAN.
Japan Patent Office; Office Action, issued in connection to patent application No. 2023-184513; Jan. 29, 2025; 4 pages; JAPAN.
Japanese Patent Office; Final Rejection, issued in connection to application No. JP2023-515777; Apr. 30, 2025; 7 pages; JAPAN.
Korean Intellectual Property Office; Notification of Provisional Rejection, issued in connection to application No. 10-2023-7008381; Jun. 19, 2025; 23 pages; KOREA.

* cited by examiner

PROCESS VESSEL ENTRY ZONES

BACKGROUND

1. Related Applications

This application is a continuation application and claims the benefit, and priority benefit, of U.S. patent application Ser. No. 17/470,913, filed Sep. 9, 2021, which claims the benefit, and priority benefit, of U.S. Provisional Patent Application Ser. No. 63/076,226, filed Sep. 9, 2020, the disclosure and contents of which are incorporated by reference herein in their entirety.

2. Field of the Invention

The presently disclosed subject matter relates to improving the functionality and efficiency of industrial process vessels.

3. Description of the Related Art

Many industrial process vessels include fluid process streams entering and exiting the vessel. Some vessels can have streams that migrate or recycle within or around the vessel. Commercial process vessels can be from 4 inches to 18 feet in diameter and 1 to 100 feet in height. Conventional vessels can include bed materials, which are typically 3 inches in size or less.

Materials can be loaded into process vessels as a packed bed of elements. Within a packed bed, space exists between the elements, known as "interstitial space." Additionally, elements can have space that exists within themselves, defined as "internal void." Fluid flow in a packed bed occurs in the interstitial spaces and internal voids unless the sizes of the individual spaces and voids are typically less than one micron. The "porosity" of the packed bed is defined as the total volume of the interstitial spaces and internal voids available for fluid flow in the packed bed divided by the total volume of the packed bed. It has been commonplace in the industry to overlap these terms, creating confusion. The definitions are created here so they can be used in interpreting the remainder of the document.

Processing elements are loaded into process vessels as packed beds. Processing elements can be catalysts, sorbents, or the like. These processing bed elements are typically formed as small kernels the size of corn or rice via extrusion or other methods. Conventional processing elements weigh in the range of 25 to 50 pounds per cubic foot. Weight per piece can be 10 to 50 mg. Porosity is an important value when considering the performance and behavior of a processing bed. Processing bed porosity is typically in the range of 30-45% and is entirely composed of interstitial space. Lacking voids available for fluid flow, processing bed internal void is 0%.

Vessels are designed and operated in cycles, that is, in a series of continuous modes each lasting for weeks, months or years. End-of-cycle vessel operations can be triggered by exhaustion of the capabilities of processing bed elements disposed within the vessels, pressure drop, shutdown for required vessel inspections, upsets (e.g., a power outage) and the like.

In a process vessel, fluids flow from entry to exit via pressure differential. This differential is referred to as pressure drop. The higher the pressure drop, the harder upstream pumps and compressors have to work. Once the pressure drop increases past a certain point the pumps and compressors can no longer keep up with the higher pressure differential and the unit must be shut down. Increased pressure drop is not desired.

Improvements in this field of technology are desired.

SUMMARY

The following presents a simplified summary of the disclosed subject matter in order to provide a basic understanding of some aspects thereof. This summary is not an exhaustive overview of the technology disclosed herein.

In certain illustrative embodiments, a method of providing improved stability and filtration of fluid process stream flow in a process vessel is provided, which can include: passing the fluid process stream flow through a processing zone within the process vessel, the processing zone containing one or more beds of processing elements; and prior to passing the fluid process stream flow through the processing bed, passing the fluid process stream flow through an entry zone located upstream of the processing bed, wherein the entry zone contains a bed of stability-improving materials which can have a porosity in the range from 67% to 87%, which can have a density in the range from 30-60 lbs/ft3, and can have a weight per piece of 25-200 grams. The stabilizing materials can have internal void capable of capturing undesired species from the fluid process stream flow. The entry zone can include one or more layers of stability-improving materials. There can be a treating zone downstream the entry zone. The stability-improving material stabilize and prevent movement of the treating elements in the treating zone. The internal void of the stability-improving material can contain a network of interconnected pores that are able to trap and retain undesired particles. The internal void of the stability-improving material can be tortuous. The internal void can be 20%-42% of the entry zone volume. The internal void can be 20%-40% of the entry zone volume. The internal void can be 25%-42% of the entry zone volume. The internal void can be 25%-35% of the entry zone volume. The internal void can be 30%-40% of the entry zone volume. The internal void can be 30%-35% of the entry zone volume. The internal void can be 20%-35% of the entry zone volume. The weight per piece can be 30-200 grams. The weight per piece can be 65-200 grams. The weight per piece can be 70-300 grams. The weight per piece can be 70-200 grams. The weight per piece can be 35-300 grams. The weight per piece can be 12-200 grams. The weight per piece can be 12-300 grams. The weight per piece of the stability-improving material can be 2500-4000 times greater than the downstream processing elements. The weight per piece of the stability-improving material can be 2-25 times greater than the downstream treating elements. The weight per piece of the stability-improving material can be 2-10 times greater than the downstream treating elements. The stability-improving material can stabilize and prevent movement of the processing elements in the processing bed. The fluid process stream flow exiting the entry zone can flow directly into the processing bed or treating zone. The stability-improving material can stabilize and prevent movement of the process elements in the processing bed. A permeable mesh can separate the entry zone and the processing bed. A void space can present between the exit of the entry zone and the entrance to the processing bed. The composition of the stability-improving materials in the entry zone can include one or more of iron, tungsten, zirconium, titania, alumina, and the like. The composition of the stability-improving materials in the entry zone can include one or more oxides of iron, tungsten, zirconium, titania, alumina, and the like.

The composition of the stability-improving materials in the entry zone can include one or more carbides of iron, tungsten, zirconium, titania, alumina, and the like. The stability-improving materials in the entry zone can be secured to the internal walls of the process vessel.

In certain illustrative embodiments, a process vessel is provided. The process vessel can include: a processing zone containing one or more beds of processing elements; and an entry zone located upstream of the processing bed, the entry zone comprising a bed of stability-improving materials having a porosity in the range from 67% to 87%, a density in the range from 30-60 lbs/ft3, a weight per piece of 25-200 grams, and an internal void capable of capturing undesired species from a fluid process stream flow passing therethrough. The process vessel can be, for example, a reformer, a hydrotreater, a naphtha hydrotreater, a fluid catalytic cracker gasoline treater unit, a hydrodesulfurization unit, an isomerization unit, or a sulfur recovery unit.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

According to the various illustrative embodiments disclosed herein, materials and related methods for improving the functionality and efficiency of a processing bed 40 in an industrial process vessel 10 are provided.

Figure 1:
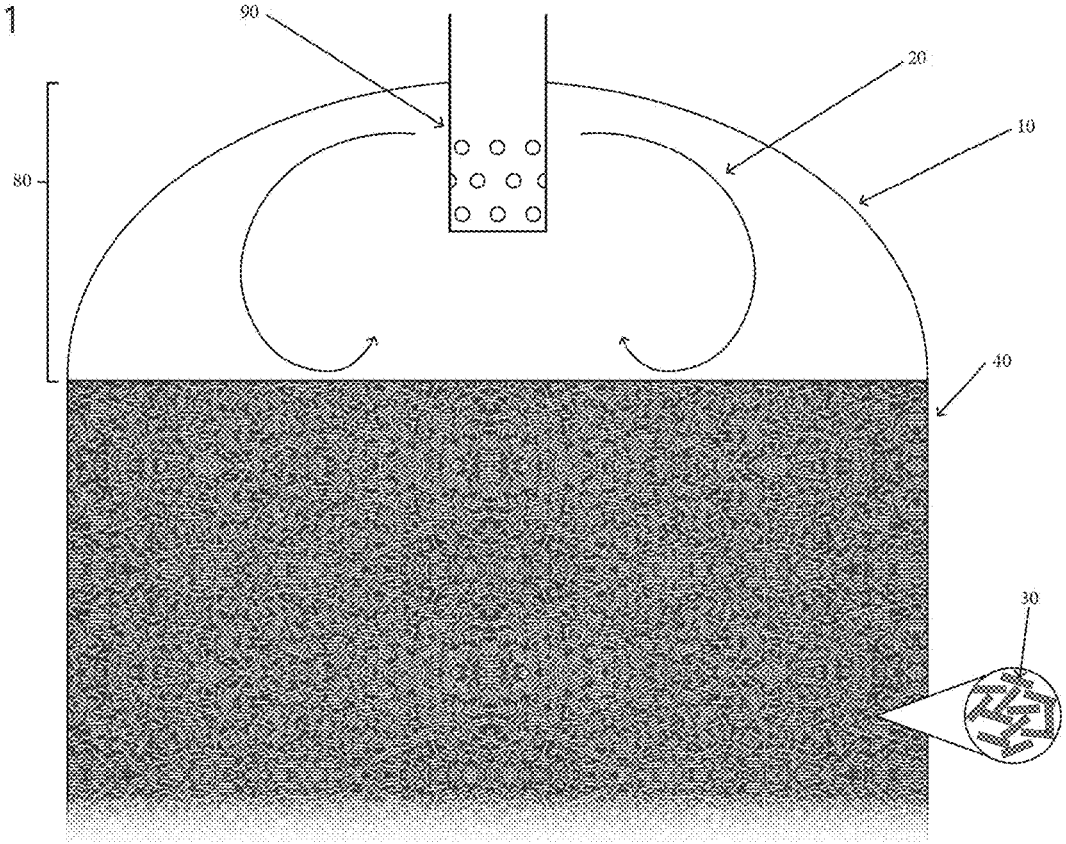
FIG. 1 is an illustration of vorticity and horizontal diffusion in a process vessel in accordance with an illustrative embodiment of the presently disclosed subject matter.
Figure 2:
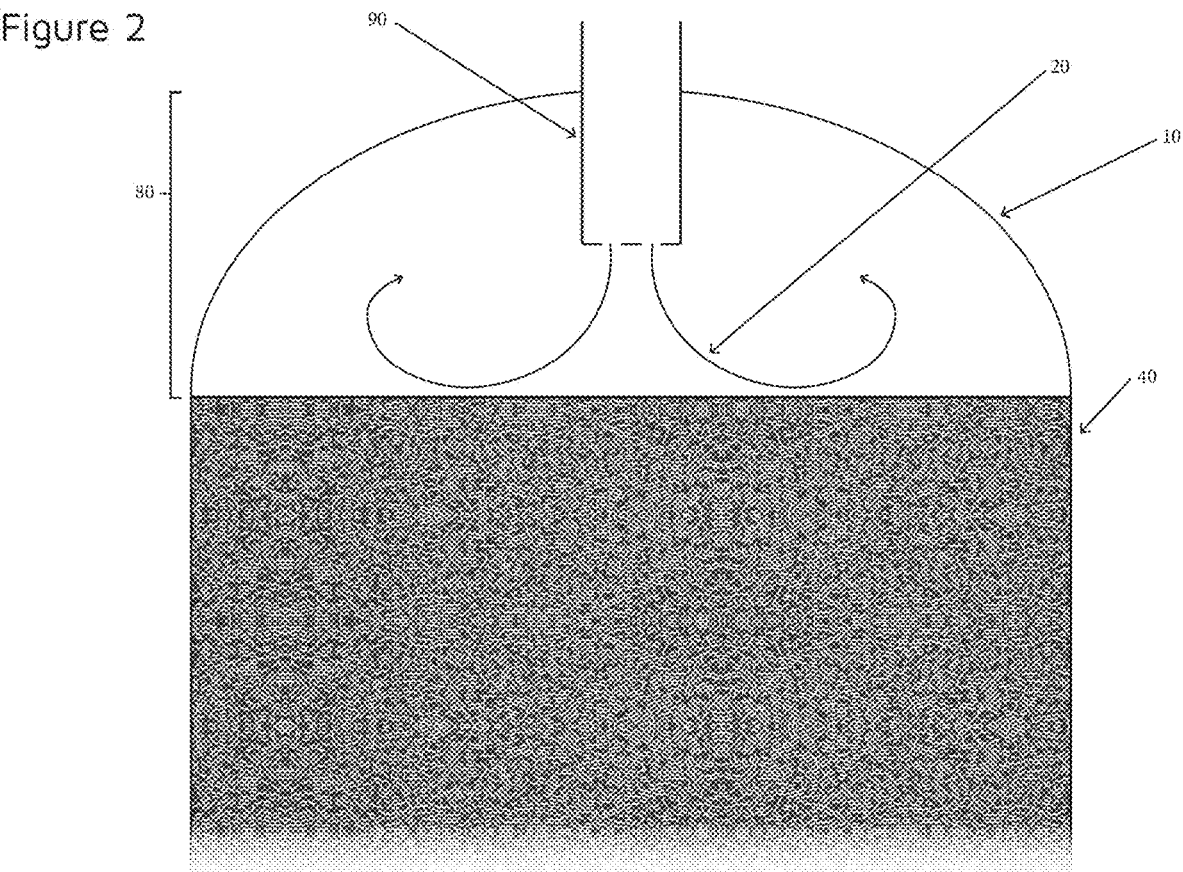
FIG. 2 is an illustration of vorticity and vertical diffusion in a process vessel in accordance with an illustrative embodiment of the presently disclosed subject matter.

FIG. 1 and FIG. 2 are illustrations of a process vessel 10. Process vessels 10 can include mechanical devices to help distribute and reduce high velocities in the feed streams 20 entering the vessel 10. These zones of the vessel 10 can be described as inlet zones 80, which are installed between the primary feed stream input flange and bed materials. Inlet zones 80 can help to distribute and reduce high velocities in the entering feed streams 20. Inlet zones 80 can comprise devices such as engineered stream diffusion nozzles 90, as well as perforated plates and distribution trays 200. Such devices can be complex engineered devices that can be expensive and bulky. Expense includes the efforts to engineer, design, install, operate and maintain the facilities. Conventional engineered inlet zones 80 typically consume approximately 2 to 4 feet of vertical space within a vessel 10.

Other mechanical devices, herein called "intrusive devices" have been known to be installed and intrude into the packed bed of the vessel where bed material is packed around them. These are devices which can allow fluid to bypass the top of the bed in the event plugging occurs. Examples of intrusive devices would be "trash baskets", "bypass tubes", or a "bypass device". The bypass device, embedded in bed materials, could be a collection of bypass tubes connected to a means of distribution. Disclosed materials can be used alongside these intrusive devices.

Vessels 10 have been known to have feed rates which generate high velocities at the inlet which create vorticity and horizontal/vertical diffusion. FIG. 1 is an illustration of vorticity and horizontal diffusion in a process vessel 10, and FIG. 2 is an illustration of vorticity and vertical diffusion in a process vessel 10. Inlet zones 80 are intended to help diffuse these high velocities to generate gentler fluid velocities, eliminating high velocity streams. Even so, there are cases where the inlet zones 80 are unable to reduce the fluid velocities to acceptable operating limits. Mechanical devices in the inlet zone 80 can become damaged or hindered during installation or operation which can also impeded their ability to operate correctly. The high velocities generated in these instances can initiate movement of processing elements 30 in the processing bed 40, known as "bed movement". Once the processing elements 30 begin to move, the uppermost portion of the processing bed 40 can be made to swirl and collide, with the processing elements grinding against one another. This can quickly lead to vessel shutdown as the processing elements 30 abrade and break apart, contributing to an unsustainable disturbance and loss of acceptable operating conditions.

Figure 3:
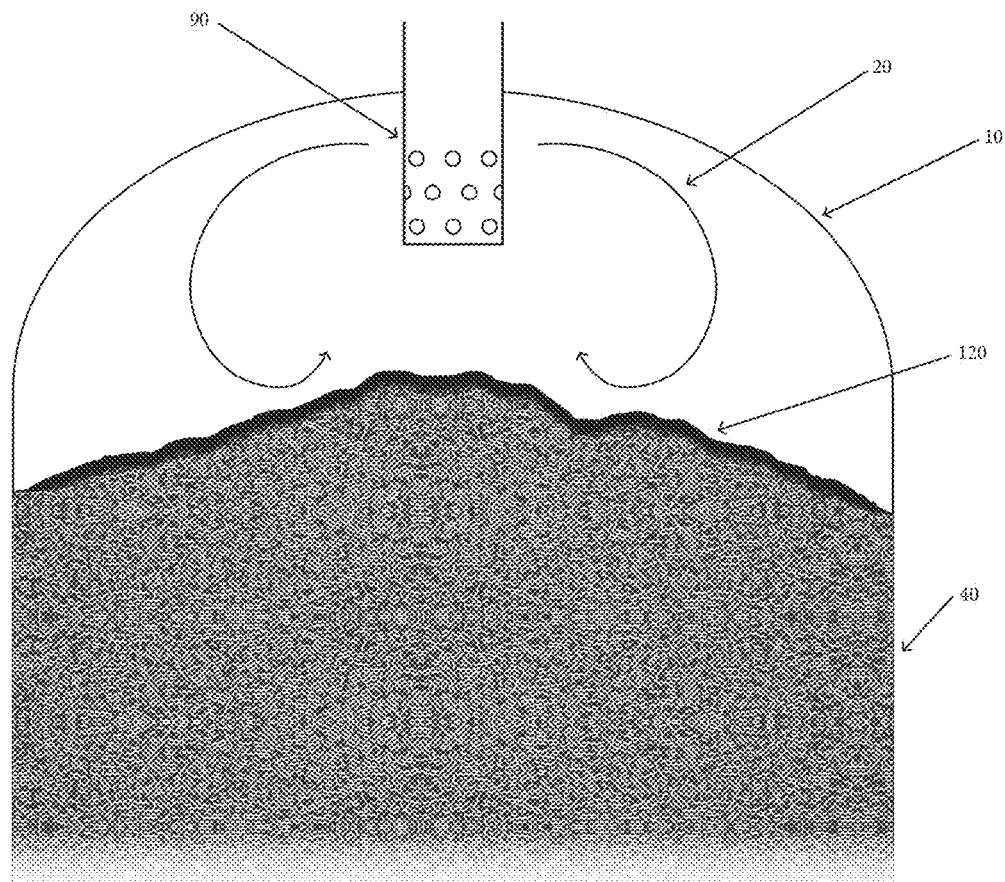
FIG. 3 is an illustration of coning in a process vessel in accordance with an illustrative embodiment of the presently disclosed subject matter.
Figure 4:
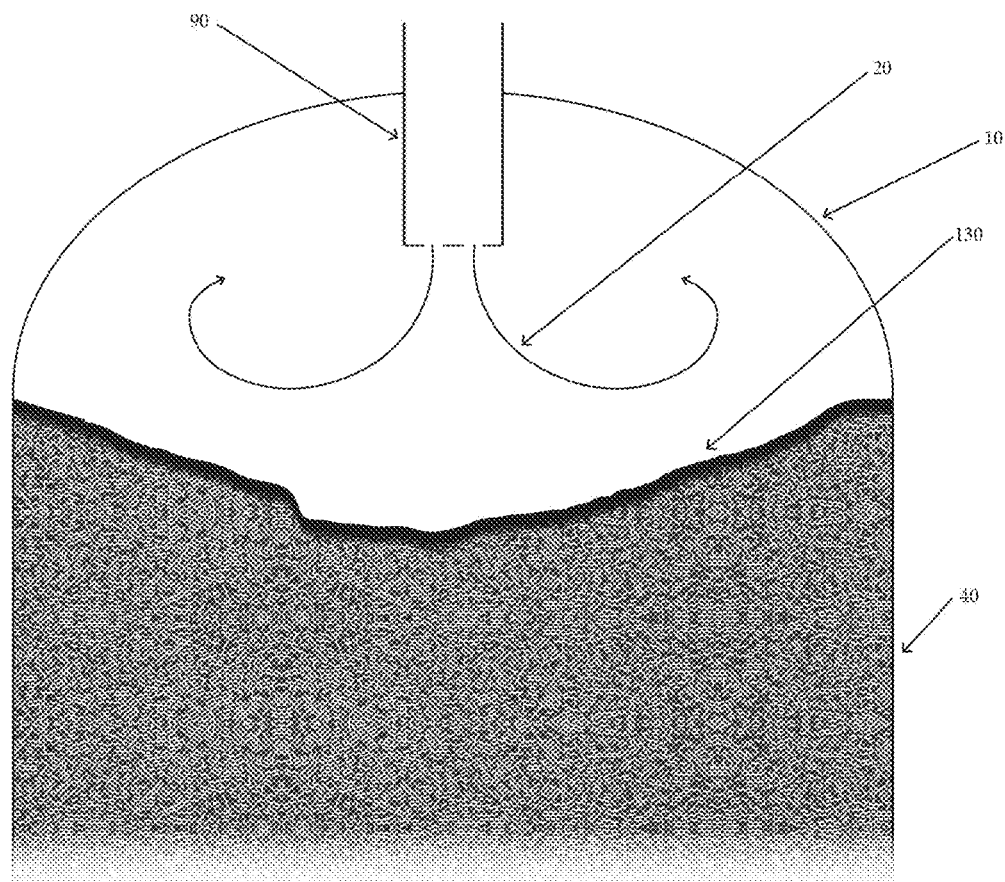
FIG. 4 is an illustration of dishing in a process vessel in accordance with an illustrative embodiment of the presently disclosed subject matter.
Figure 5:
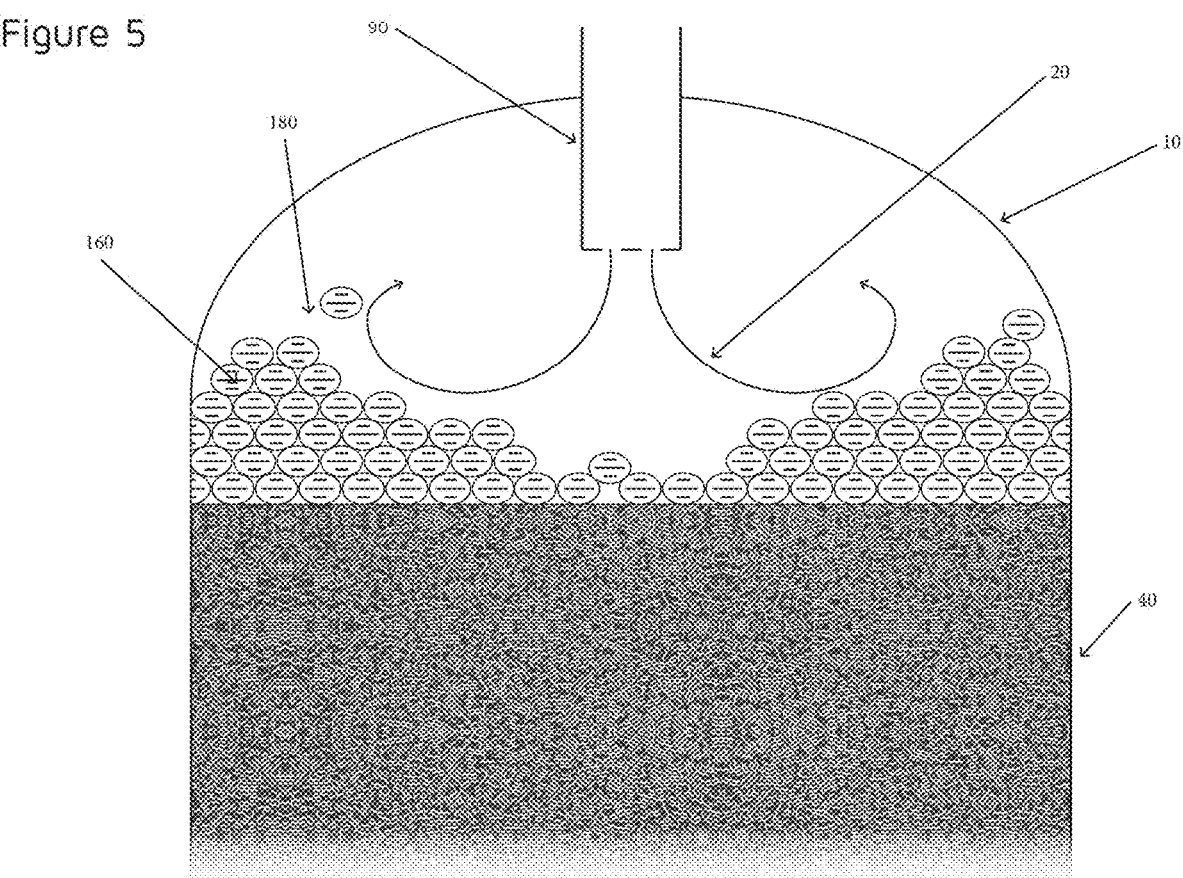
FIG. 5 is an illustration of a dished treating zone in a process vessel in accordance with an illustrative embodiment of the presently disclosed subject matter.
Figure 11:
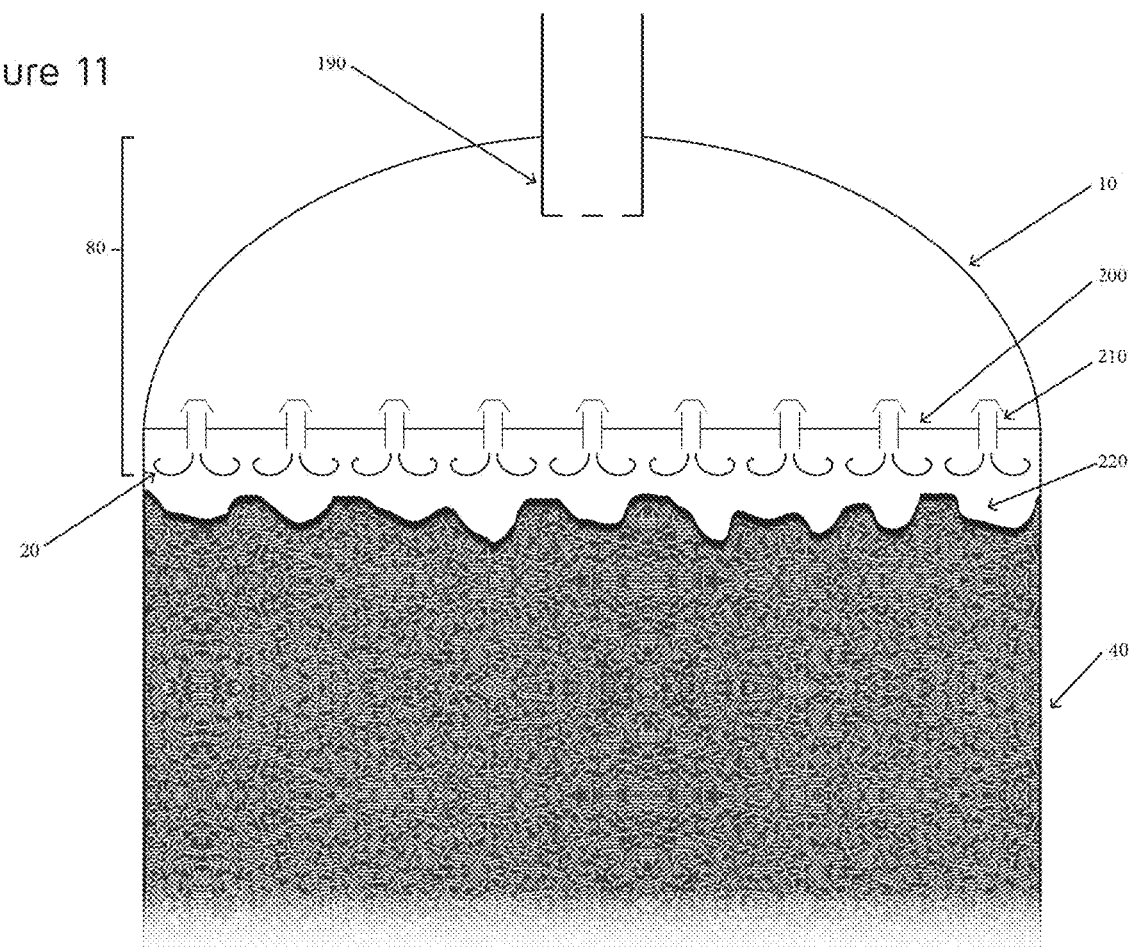
FIG. 11 is an illustration of an impinged processing bed under a distributor tray downcomer in a processing vessel in accordance with an illustrative embodiment of the presently disclosed subject matter.

Common types of bed movement events include coning, dishing, gouging, impingement, and fluffing. FIG. 3 is an illustration of coning in a process vessel 10. Coning 120 is defined as the processing elements 30 (e.g., catalyst) in the uppermost portion of the processing bed 40 being swirled and broken apart as particulates are moved toward the cross-sectional center of the processing bed 40, forming a cone. Dishing 130 is defined as the uppermost portion of the processing bed 40 swirling and breaking apart as the particulates of processing elements 30 are moved towards the cross-section perimeter of the processing bed 40 and leaving a bowl or dish shape depression in the center. FIG. 4 is an illustration of dishing in a process vessel 10. FIG. 5 is an illustration of a dished treating zone 180 in a process vessel 10. Gouging is where the high fluid velocities only affect a small portion of the processing elements 30, but it is enough to create an asymmetric gouge or scar in a small location of the processing bed 40, pushing the broken processing elements 30 into other parts of the bed 40. Fluffing includes situations where flow rate is reversed from the normal down flow operation. When fluids move upward at a sufficient velocity they can entrain bed materials. Impingement can be defined as the instruction of a fluid into a packed bed causing bed materials to be displaced forming a hole. FIG. 11 is an illustration of an impinged processing bed 220 under a distributor tray downcomer 210 in a processing vessel 10. In any of these types of bed movement events, the result can be catastrophic and can end the cycle of the processing vessel 10, where a shutdown may be required to fix the problem.

Figure 6:
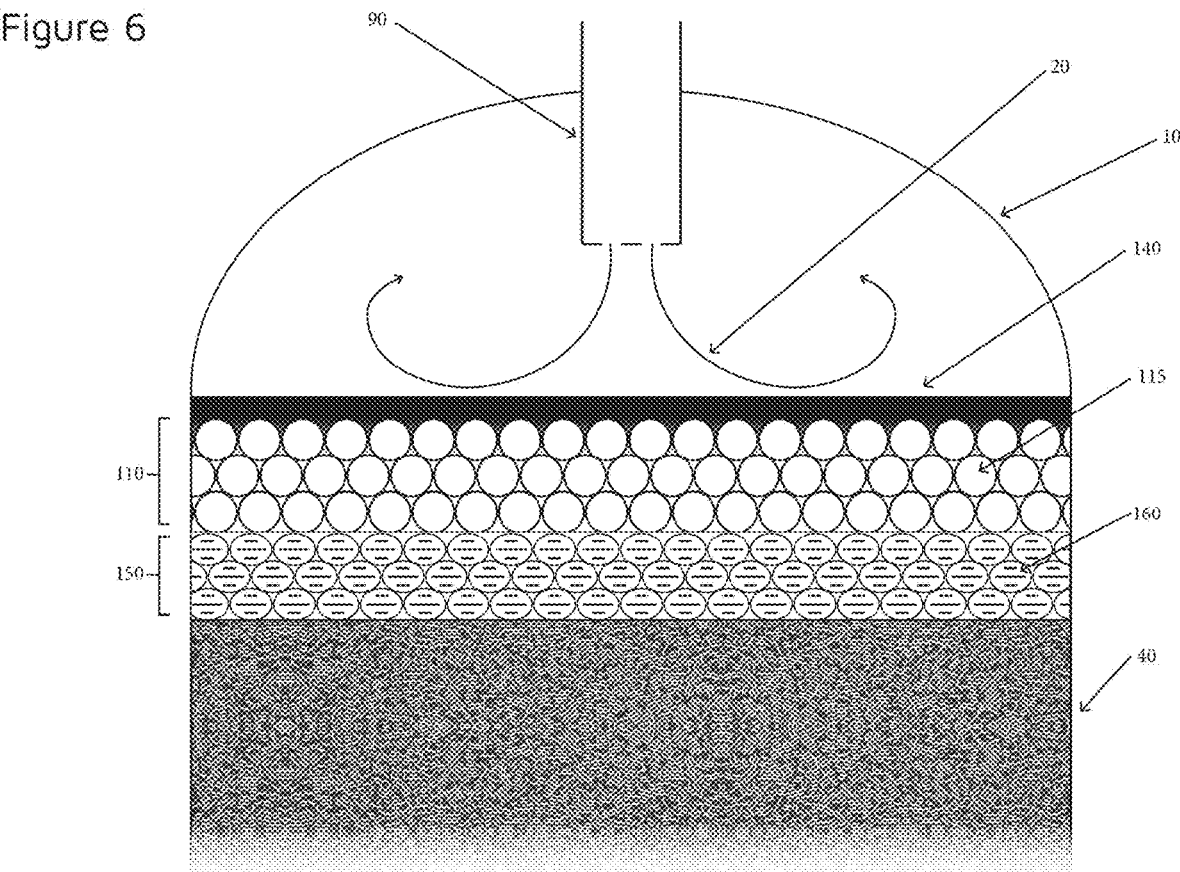
FIG. 6 is an illustration of a stabilizing zone on top of a treating zone, where fouling has occurred above the stabilizing zone, blocking off access to the downstream treating zone in accordance with an illustrative embodiment of the presently disclosed subject matter.
Figure 7:
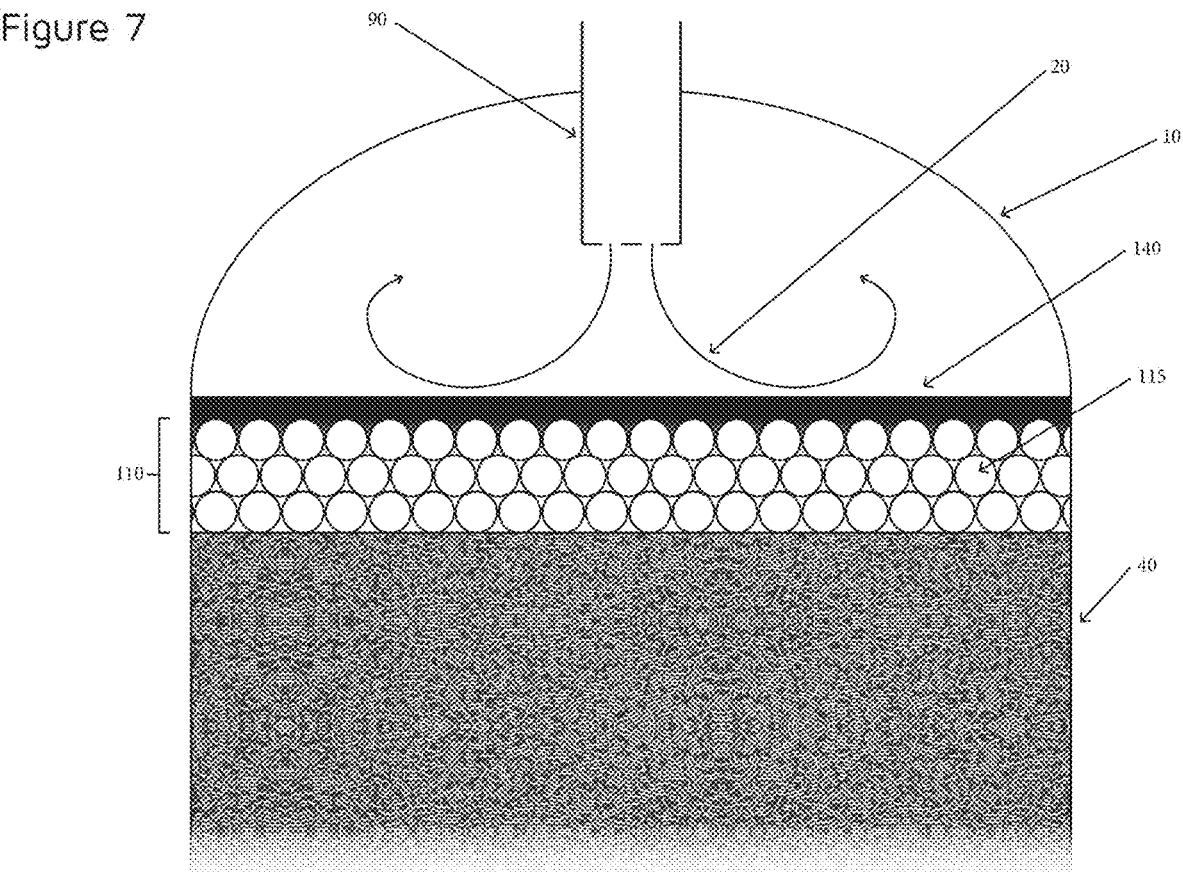
FIG. 7 is an illustration of a stabilizing zone with high velocity streams and fouling in a process vessel in accordance with an illustrative embodiment of the presently disclosed subject matter.

Some processing vessels 10 can include stabilizing zones 110 intended to stabilize beds 40 of processing materials 30 contained in the process vessel 10 and can offer protection or can eliminate these bed movement events. FIG. 6 is an illustration of stabilizing zones with high velocity streams 20. Stabilizing zones 110 can contain stabilizing elements 115 and are installed below the inlet zone 80 and upstream of the processing elements 30. Conventional stabilizing zones 110 consist of stabilizing elements 115 typically made from ceramic and can include elements such as support balls, dogbones, butterflies, wagon wheels and the like. These elements 115 have densities in the range of 55-130 pounds per cubic foot, a packed bed porosity of 40%-65%, and a weight per element of 3 grams to 190 grams. Although suitable for stabilizing, these elements 115 have poor filtration performance due to their low porosity. The internal void porosity of stabilizing elements 115 is typically close to zero percent (0%). However, these elements 115 can have an internal void of 3-5% and potentially up to 20%. A bed of stabilizing elements 115 with an internal void of 20% corresponds to approximately 65% porosity. The porosity of the packed bed is defined as the total volume of the spaces and voids available for fluid flow in the packed bed divided by the total volume of the packed bed. Low porosity is defined as any packed bed with less than or equal to 65% total porosity. Conversely, high porosity is defined as any bed with over 65% total porosity. Low porosity beds can create problems due to caking, plugging, etc. of the stabilizing elements 115. Particles deposit on the surface and can build up eventually plugging the vessel 10 and creating a cake layer 140. FIG. 7 is an illustration of stabilizing zones with high velocity streams and fouling that creates a cake layer 140. Stabilizing elements 115 utilize volumes and depths within the vessel 10 which detract from the amounts of processing materials 30 in processing bed 40 that can be installed in the vessel 10 and, accordingly, detracts from the processing capability of the processing bed 40.

Figure 8:
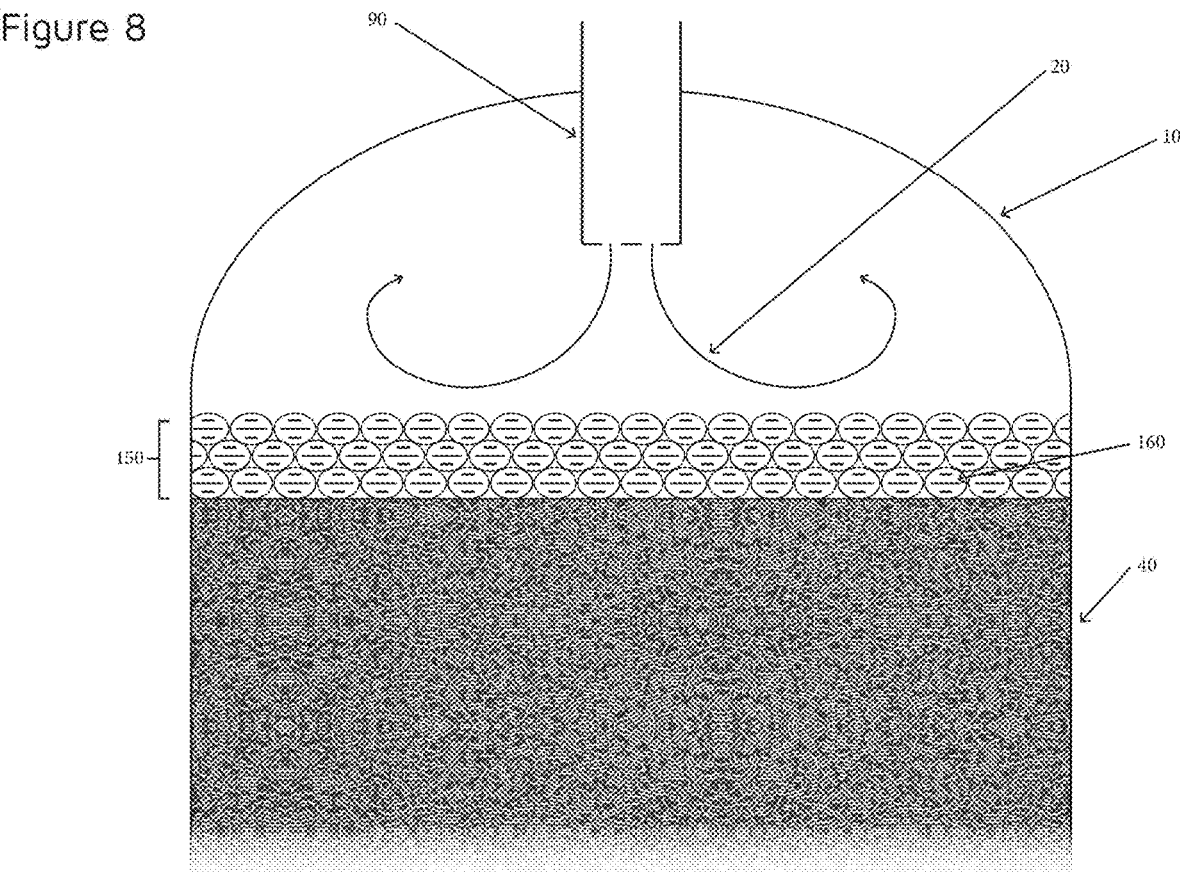
FIG. 8 is an illustration of a treating zone with fluid processing streams in a process vessel in accordance with an illustrative embodiment of the presently disclosed subject matter.

Process vessels 10 can also include treating zones 150 installed to facilitate internal filtration of undesired species contained within streams. Treating zones 150 can contain treating elements 160. FIG. 8 is an illustration of a treating zone 150 with fluid processing streams 20 in a process vessel 10. Treating zones 150 are typically placed upstream of processing beds 40. Treating elements 160 are intended to help mitigate caking and plugging problems in the vessel 10 and are designed to have a large internal capacity for particles. Treating elements 160 have densities in the range of 12-30 pounds per cubic foot, a porosity of 88%-95%, and a weight per element of 8-30 grams. The high porosity provides the treating elements 160 with the ability to store large amounts of particles before pressure drop formation can take place in the vessel 10. However, the large porosity exposes the elements 160 to a lower velocity threshold of bed movement. When these elements 160 are used on top of the bed, with sufficiently high velocity streams, movement of bed materials is possible, which can create a coned or dished bed of treating elements 160 or other bed disturbance.

The stabilizing zone 110 comprised of stabilizing elements 115 can be positioned upstream of the treating zone 150 of treating elements 160 in order to provide resistance to bed movement. In these cases, the stabilizing elements 115 can prevent bed movement, but introduce two additional undesirable constraints on the vessel 10 similar to the constraints already discussed above. The stabilizing elements 115 can require an increase in vessel volume and depth to install at the cost of the removal of processing elements 30 or other bed materials. Also, the stabilizing elements 115 can block any particles from being stored in the downstream treating zone 150, rendering the high porosity required for treating zone particle storage unusable. This can lead to an undesirable increase in pressure drop caused by particle accumulation 140 in the stabilizing zone 110.

Figure 9:
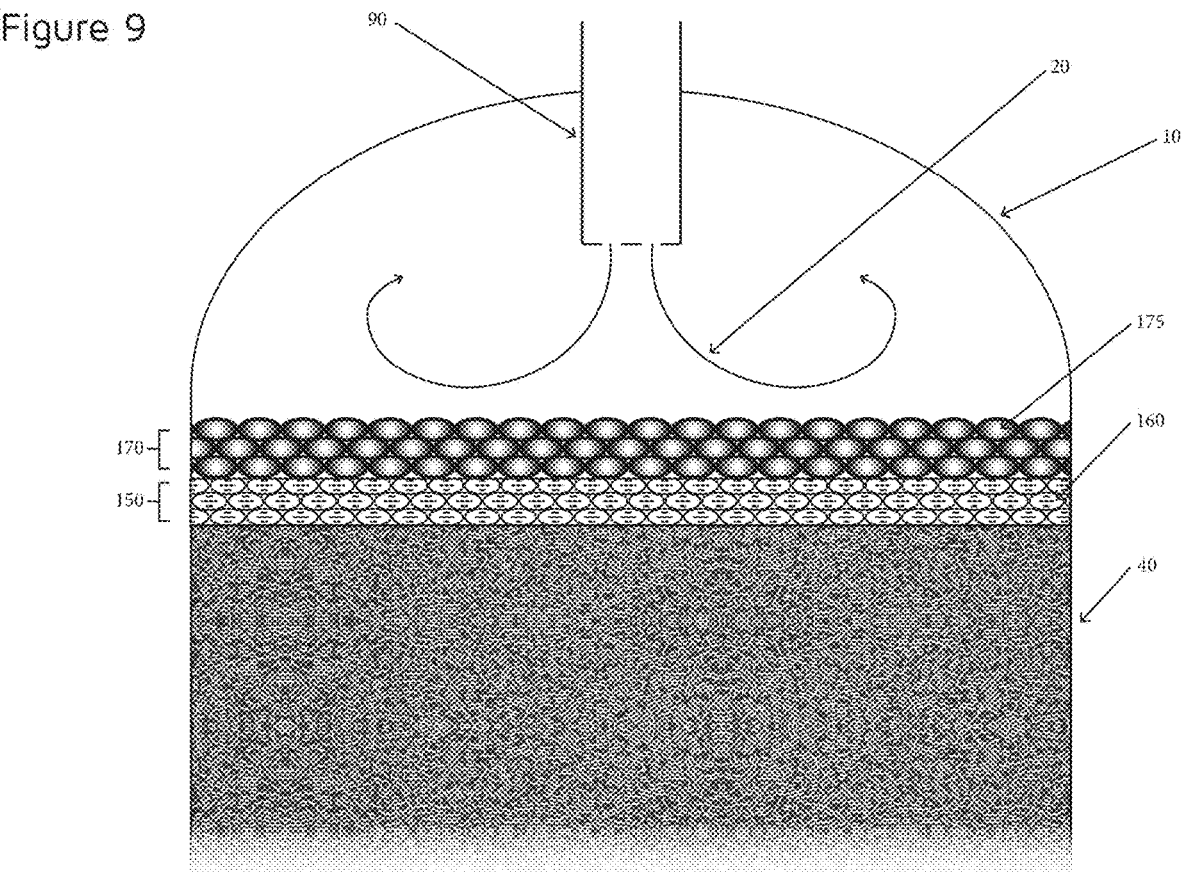
FIG. 9 is an illustration of a stability-improving material and a treating zone beneath the stability-improving material in a process vessel in accordance with an illustrative embodiment of the presently disclosed subject matter.
Figure 10:
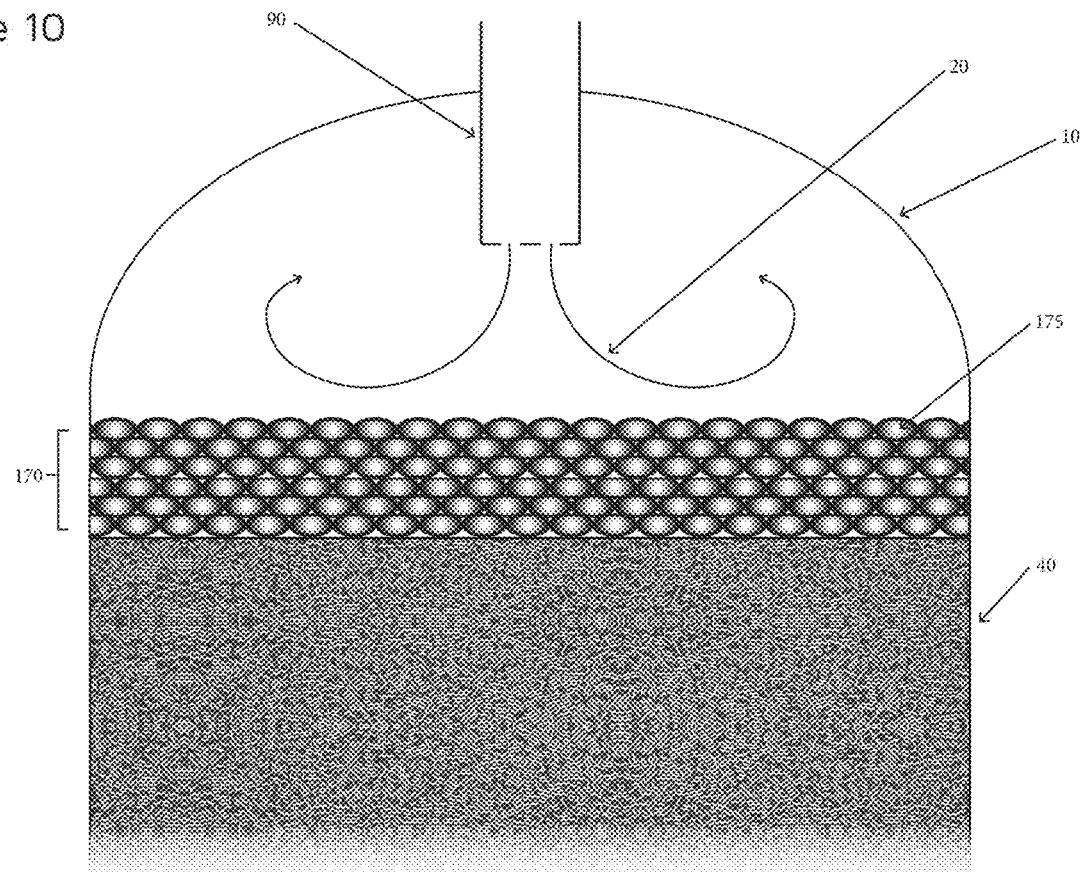
FIG. 10 is an illustration of a stability-improving material and a processing bed beneath the stability-improving material in a process vessel in accordance with an illustrative embodiment of the presently disclosed subject matter.

In certain illustrative embodiments, process vessels 10 can contain one or more entry zones 170 containing stability-improving materials 175. The entry zones 170 address bed movement and filtration problems. FIG. 9 is an illustration of a stability-improving material 175 and a treating zone beneath the stability-improving material 175, and FIG. 10 is an illustration of a stability-improving material 175 and a processing bed 40 beneath the stability-improving material 175.

Bed movement problems can be characterized as a mismatch between the velocity of the process stream 20 as it enters the processing bed 40 and the material properties of the processing elements 30 at the top of the bed 40. In a packed bed with no external fluid forces applied, gravity is the only force which holds the elements 30 in place. If the fluid forces applied to the elements 30 overcome the gravitational forces, bed movement will occur. The force which a fluid can apply to a given element is proportional to the density of the fluid, the square of the velocity of the fluid, and the area of that element. Higher density fluids and higher velocities enable larger forces. The velocity at which an element in a bed can move depends largely on its surface area and weight per piece. Elements with large surface areas or low weight per piece tend to be easier to move for a given velocity. To avoid bed movement for given fluid properties of density and velocity, the weight per piece of the element must be increased and the surface area decreased. It has been thought that the low surface area requirement would preclude high porosity with high surface area materials from being used as a stabilizing material. Surprisingly, this has been shown to be incorrect and, by selecting the correct properties, high porosity, high surface area materials can be used for stabilizing while providing the filtration capacity to retain incoming particles.

Undesired species are contained in streams 20 entering the entry zone 170. Longevity of entry zone 170 is important because the useful life of the entry zone 170 is desired to out-live that of a cycle of a process vessel 10, including the activity of processing bed material 30. Pressure drop control is also important as particle deposition in the processing bed material 30 can increase the pressure through the beds in vessel 10. Increase in pressure must be minimized to ensure designed performance of the vessel 10. Additionally, entry zone 170 should be designed to withstand feed stream forces and velocities in order to avoid bed movement.

Figure 12:
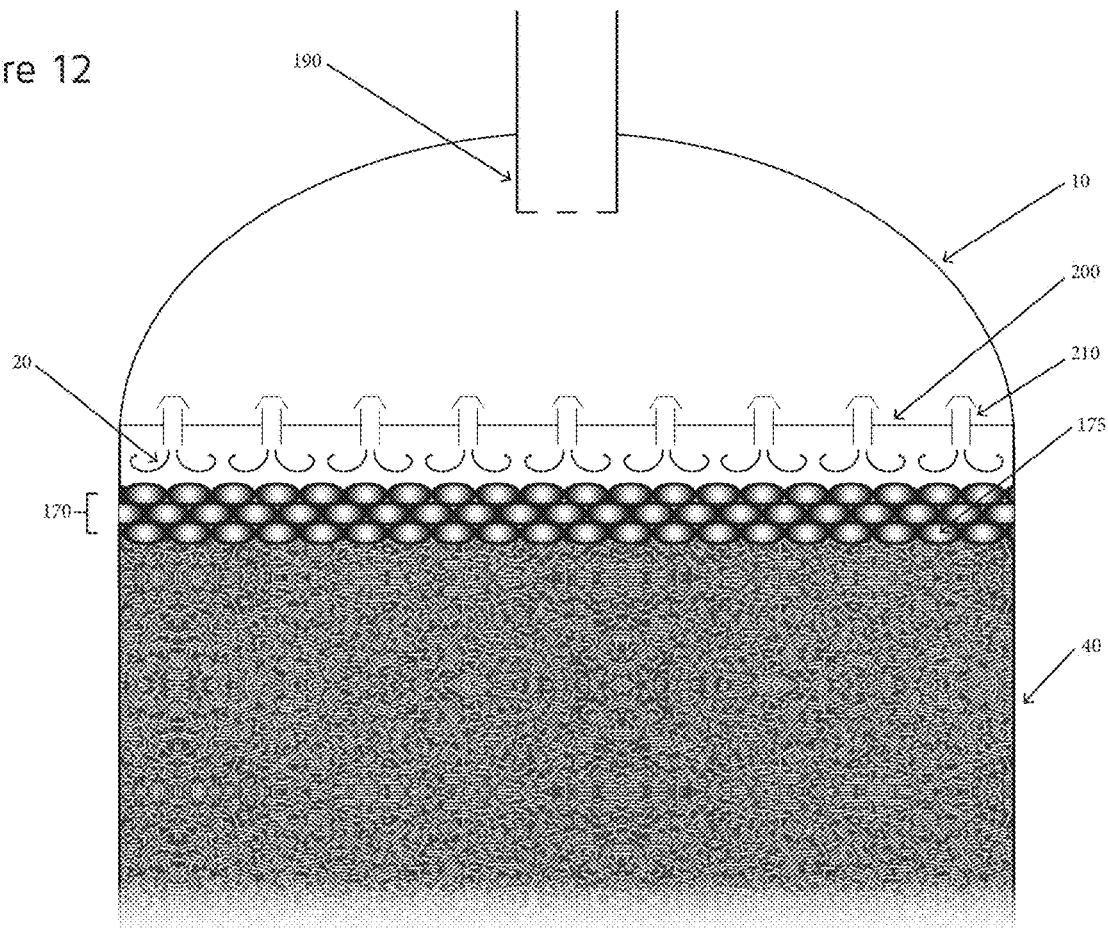
FIG. 12 is an illustration of a stability-improving material positioned below a distributor tray and protecting a processing bed in a process vessel in accordance with an illustrative embodiment of the presently disclosed subject matter.

The entry zone 170 is intended to improve the stability of downstream operations. Stability-improving material 175 allows for resistance to coning, dishing, impingement, or fluffing while also providing the ability to filter particles from the process stream 20 without detriment to the operation of vessel 10. FIG. 12 is an illustration of a stability-improving material 175 positioned below a distributor tray 200 and protecting a processing bed 40 from fluid process streams 20 coming out of the distributor tray downcomer 210 in a process vessel 10. Some stability-improving materials 175 can have holes or pores sized from 1 mm to 15 mm. Stability-improving materials 175 are typically more dense than downstream bed materials or have a higher weight per piece than downstream bed materials.

Stability-improvement materials 175 can be differentiated by the presence of heavy chemical species, a reduced internal void space of the materials 175, and an increase in size. Another option includes fabrication of materials 175 that are adhered to the walls of the vessel 10 or spread as a sheet or mesh of materials 175 across the circumference of the vessel 10 to constrict movement of downstream materials. Alternatively, a porous, solid screen or membrane can be disposed on top of and/or below the one or more entry zones 170 to prevent movement of the materials 175 in the entry zone 170 as well as that of downstream zones. The entry zone 170 can internally filter undesired species from the incoming streams 20. The media in the entry zone 170 can include materials 175 whose porosity is capable of attracting and retaining undesired species passing through the entry zone 170. Streams can exit the entry zone 170 and enter downstream operations. Entry zone 170 can be disposed in layers reflecting different geometries and/or characteristics of the media contained in each layer. An example would be an entry zone 170 containing three layers of materials 175, each with a different size, porosity, or pore size. Such layers in entry zone 170 are intended to facilitate filtration of the fluid streams passing through them. An entry zone 170 can be layered such that the largest sizes of materials 175 are on the top, and/or the largest porosity of materials 175 is on the top, and/or the heaviest pieces of materials 175 are on top.

Entry zone 170 can provide filtration upstream of downstream processing bed operations. Filtered fluids that are removed from streams containing undesired species are referred to herein as "filtrate." The undesired species removed from these streams are referred to herein as "filtrant." Filtrant is trapped and retained on stability-improving material 175.

Stability-improving materials 175 can contain a network of interconnected pores that are able to trap and retain undesired particles. Elements with interconnected pores provide surface area and residence time to facilitate (i) separation of filtrate from filtrant and (ii) retention of filtrant. Such pores are typically between 2 microns and 5000 microns in size.

Stability-improving materials 175 can be tortuous porous elements. Tortuous porous elements are defined herein as those containing sinuous, winding, internal porous flow passageways which provide surface area and residence time to facilitate (i) separation of filtrate from filtrant and (ii) retention of filtrant. Such passageways are typically between 2 microns and 5000 microns in size.

The presently disclosed materials 175 in entry zone 170 can reduce the required depth of material positioned upstream of the processing beds in vessel 10 while also achieving bed stability, facilitating filtration, and allowing increased utilization of the processing bed capabilities in vessel 10.

Figure 13:
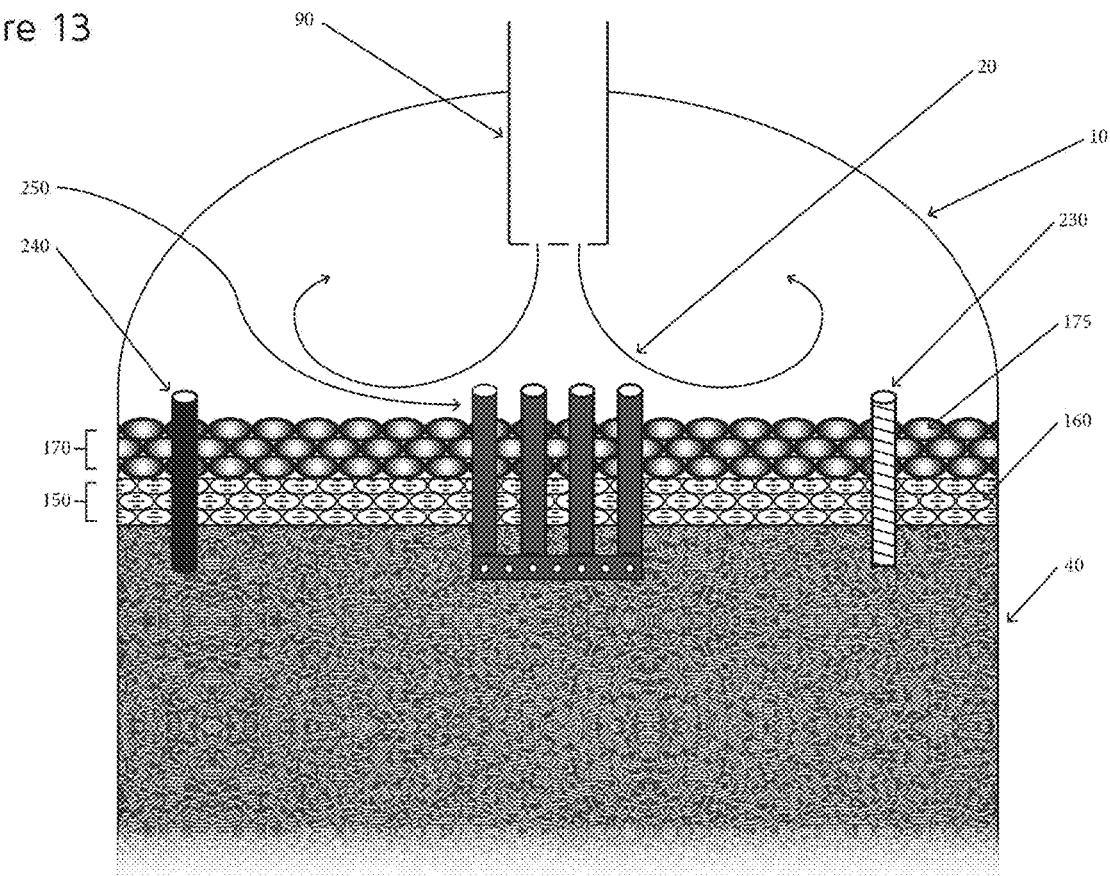
FIG. 13 is an illustration of three intrusive devices known as trash baskets, bypass tubes, and a bypass device, where each are shown to be embedded in or through the entry zone in accordance with an illustrative embodiment of the presently disclosed subject matter.

In certain illustrative embodiments, stability-improving material can surround an intrusive device such that the intrusive device is embedded, partially or wholly, in the entry zone. FIG. 13 is an illustration of three intrusive devices known as trash baskets 230, bypass tubes 240, and a bypass device 250, where each are shown to occupy part of the entry zone 170.

In certain illustrative embodiments, the presently disclosed materials 175 in entry zone 170 can be constructed to have a desired combination of weight, strength and porosity to enable stream stability and filtration within the entry zone 170 of the process vessel 10. The materials 175 can result in improvements in vessel 10 including reduced vertical space requirements, eliminating or significantly reducing bed movement, minimizing increase in pressure drop when capturing foulant, and improving cycle-length of the performance of vessel 10.

The use of disclosed materials 175 can achieve bed porosities which are favorable for filtration while also having material densities and weight per piece which are favorable for bed stabilization. The disclosed porosities in entry zone 170 would be in the range of 67% to 87%. In other illustrative embodiments the porosities would be in the range of 70% to 87%. In yet other illustrative embodiments, the porosities would be in the range of 75% to 87%. In yet other illustrative embodiments, the porosities would be in the range of 75% to 85%.

The disclosed density ranges in entry zone 170 would be in the range of 30-60 pounds per cubic foot.

The disclosed weight per piece for the materials 175 in the disclosed entry zone 170 would be from 2500-4000 times greater than that of the materials 30 in the downstream processing bed 40. For example, if the downstream processing bed 40 contained materials 30 having a weight per piece of 10-50 milligrams, the materials 175 in the disclosed entry zone 170 could have a weight per piece of 25-200 grams per piece. In another illustrative embodiment, the weight per piece of materials 175 could be in the range of 60-200 grams. In another illustrative embodiment, the weight per piece of materials 175 could be in the range of 65-200 grams. In another illustrative embodiment, the weight per piece of materials 175 could be in the range of 70-200 grams. In another illustrative embodiment, the weight per piece of materials 175 could be in the range of 75-200 grams. In another illustrative embodiment, the disclosed weight per piece for the materials 175 in the disclosed entry zone 170 could be from 5-10 times greater than that of the elements in the downstream treating zone. For example, if the downstream processing bed zone materials had a weight per piece of 7-30 grams, the materials 175 in the disclosed entry zone 170 could have a weight per piece of 35-300 grams per piece. In another illustrative embodiment, the disclosed weight per piece for the materials 175 in the disclosed entry zone 170 could be from 2-25 times greater than that of the elements in the downstream treating zone.

Unexpectedly, it has been found that an increase in a material's internal void space, while significantly reducing the weight per piece, improves the material's stabilizing capability. It was thought the reduced weight, combined with the additional drag added by the increased surface area from the internal void would cause the material to become easier to move. Conversely, it has been demonstrated that the permeability of the internal void helps contribute to the gravitational force already holding it in place, thus increasing the stability.

One driver of improving stabilizing zone capability is weight per piece. Another important driver for filtration is internal void. As that internal void is filled and the filtration material becomes used, it loses the permeability it derives from the internal void and can be more easily moved. The conclusion that the stability can change throughout the cycle is key in designing stable entry zone material which can also perform well in filtration. Using a material which has good stabilizing and good filtration performance turns into a balance of controlling the initial weight per piece, but also determining an internal void that will provide significant filtration capability.

In one illustrative embodiment, the disclosed stability-improving material 175 has an internal void in the range of 20-42% with the interstitial space making up the balance of the described porosity. In another illustrative embodiment, the disclosed stability-improving material 175 has an internal void in the range of 20-40% with the interstitial space making up the balance of the described porosity. In another illustrative embodiment, the disclosed stability-improving material 175 has an internal void in the range of 25-40% with the interstitial space making up the balance of the described porosity. In another illustrative embodiment, the disclosed stability-improving material 175 has an internal void in the range of 20-35% with the interstitial space making up the balance of the described porosity. In another illustrative embodiment, the disclosed stability-improving material 175 has an internal void in the range of 25-35% with the interstitial space making up the balance of the described porosity. In another illustrative embodiment, the disclosed stability-improving material 175 has an internal void in the range of 30-40% with the interstitial space making up the balance of the described porosity. In another illustrative embodiment, the disclosed stability-improving material 175 has an internal void in the range of 30-35% with the interstitial space making up the balance of the described porosity. This internal void would provide good filtration performance, while surprisingly, bolstering the stabilizing capability of the material 175. The advantage of the disclosed material 175 when compared to that of other materials with internal void is the weight per piece has been increased by the introduction of heavier materials, providing a good initial stabilizing capability, and a slight reduction in the internal void, which means the stabilizing capability remains more constant throughout the cycle while still providing the capability to store filtrant. Both additions of increased weight per piece and reduced internal void improve the ability of the material 175 to withstand bed movement in high fluid velocity applications throughout the cycle life of the vessel 10.

This disclosed combination of porosity, density range, weight per piece, and resulting functionality, is not used in existing vessels and materials. In one example of existing materials, bed porosity in the range of 40-65% is maintained to achieve a density of 55-130 pounds per cubic foot. This porosity range and density range leads to materials which have good stability performance, but lead to poor filtration performance. In another example, to achieve good filtration performance, porosity is in the range of 88-95%. To achieve this porosity, existing materials have a density in the range of 12-30 pounds per cubic foot and a weight per piece in the range of 8-30 grams. This density range, porosity range, and weight per piece range lead to materials which have good filtration performance, but lack required stability performance.

In certain illustrative embodiments, the presently disclosed materials 175 can be disposed within one or more entry zones 170 within a vessel 10 as individual zones or as a unified zone of material. Processing bed stability downstream of the entry zone 170 can be facilitated via use of weighted materials and/or by the installation of vessel 10 circumference-spanning materials. Weighting can be achieved via the use of high density, high weight per piece components in the composition of the materials 175 such as iron, tungsten, zirconium, titania, alumina, and the like, and their oxides, carbides and the like.

In certain illustrative embodiments, the presently disclosed materials 175 can include geometries such as disks, cubes, rectangular or other polyhedral shapes, eclipses, cylinders, briquettes, rings and the like. Disclosed materials 175 in entry zone 170 can be of individual sizes such that each element of material 175 fits in a space measuring from 1 cubic inch to 27 cubic inches.

The presently disclosed materials 175 can have important filtration characteristics when used in entry zone 170. In certain illustrative embodiments, the materials 175 can increasingly separate filtrates as the streams travel through the entry zone 170. Upstream filtrant removal is promoted within the porous structure of the materials 175 to the point where the individual filtration capacity of these materials 175 is exhausted. Thereafter, fluid process stream flows bypass the exhausted materials 175 and proceed thru the entry zone 170 to engage in filtrant removal with materials 175 whose filtration capacity has not been exhausted. This process proceeds through the entry zone 170 with only moderate increase in pressure within the process vessel 10.

In certain illustrative embodiments, the presently disclosed materials 175 can be utilized in vapor phase applications such as reformers, hydrotreaters including, without limitation, naphtha hydrotreaters ("NHT"), fluid catalytic cracking gasoline hydrotreater units ("GHT"), sulfur recovery units ("SRU"), hydrodesulfurization units, and isomerization units, among other potential uses. In other illustrative embodiments, the presently disclosed materials 175 can be utilized in mixed-phase applications (where liquid and gas flows are present) such as kerosene hydrotreaters ("KHT"), diesel hydrotreaters ("DHT"), cat-feed hydrotreaters ("CFHT"), gas oil hydrotreaters ("GOHT"), and other mixed phase applications.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

What is claimed is:

1. A method of providing improved stability and filtration of stream flow for fluid process streams in a process vessel comprising:

passing the fluid process streams through a processing zone within the process vessel, the processing zone containing one or more beds of processing elements; and prior to passing the fluid process streams through the processing bed, passing the fluid process streams through an entry zone located upstream of the processing bed, wherein the entry zone contains a bed of stability-improving materials having a porosity in the range from 67% to 87%, a density in the range from 30-60 lbs/ft$^3$, and a weight per piece of 12-300 grams, and wherein the stability-improving materials have internal voids capable of filtering particles from the fluid process stream flow, and wherein the weight per piece of the stability-improving materials is 2-25 times greater than the weight per piece of the processing elements in the processing zone.

2. The method of claim 1, wherein the entry zone comprises a single bed of stability-improving materials.

3. The method of claim 1, wherein there is a treating zone downstream of the entry zone.

4. The method of claim 3, whereby the stability-improving material stabilizes and prevents movement of a plurality of treating elements in the treating zone.

5. The method of claim 1, where the internal void contains a network of interconnected pores.

6. The method of claim 1, where the internal void is tortuous.

7. The method of claim 1, where the internal void is 20%-42% of the entry zone volume.

8. The method of claim 1, where the internal void is 20%-40% of the entry zone volume.

9. The method of claim 1, where the internal void is 25%-42% of the entry zone volume.

10. The method of claim 1, where the internal void is 25%-35% of the entry zone volume.

11. The method of claim 1, where the internal void is 30%-40% of the entry zone volume.

12. The method of claim 1, where the internal void is 30%-35% of the entry zone volume.

13. The method of claim 1, where the internal void is 20%-35% of the entry zone volume.

14. The method of claim 1, where the weight per piece is 12-200 grams.

15. The method of claim 1, where the weight per piece is 30-200 grams.

16. The method of claim 1, where the weight per piece is 70-200 grams.

17. The method of claim 1, where the weight per piece is 70-300 grams.

18. The method of claim 1, where the weight per piece is 35-300 grams.

19. The method of claim 1, where the weight per piece is 25-200 grams.

20. The method of claim 1, whereby the stability-improving material stabilizes and prevents movement of the processing elements in the processing bed.

21. The method of claim 1, wherein the fluid process stream flow exiting the entry zone flows directly into the processing bed.

22. The method of claim 1 wherein the composition of the stability-improving materials in the entry zone comprises one or more of iron, tungsten, zirconium, titania, and alumina.

23. The method of claim 1 wherein the composition of the stability-improving materials in the entry zone comprises one or more oxides of iron, tungsten, zirconium, titania, and alumina.

24. The method of claim 1 wherein the composition of the stability-improving materials in the entry zone comprises one or more carbides of iron, tungsten, zirconium, titania, and alumina.

25. The method of claim 1, wherein the stability-improving materials in the entry zone are secured to the internal walls of the process vessel.

26. A process vessel comprising:

a processing zone containing one or more beds of processing elements; and an entry zone located upstream of the processing bed, the entry zone comprising a bed of stability-improving materials having a porosity in the range from 67% to 87%, a density in the range from 30-60 lbs/ft$^3$, a weight per piece of 25-200 grams, and an internal void capable of capturing undesired species from a fluid process stream flow passing therethrough, wherein the weight per piece of the stability-improving materials is 2-25 times greater than the weight per piece of the processing elements in the processing zone.

27. The vessel of claim 26, wherein the process vessel comprises a reformer, a hydrotreater, a naphtha hydrotreater, a fluid catalytic cracker gasoline treater unit, a hydrodesulfurization unit, an isomerization unit, or a sulfur recovery unit.

* * * * *